(12) United States Patent
Luo et al.

(10) Patent No.: US 11,539,485 B2
(45) Date of Patent: Dec. 27, 2022

(54) REFERENCE SIGNAL TRANSMISSION METHOD AND DEVICE

(71) Applicant: Huawei Technologies Co., Ltd., Shenzhen (CN)

(72) Inventors: Zhihu Luo, Beijing (CN); Zhe Jin, Beijing (CN); Hengjin Liu, Shenzhen (CN); Weiliang Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 23 days.

(21) Appl. No.: 16/992,864

(22) Filed: Aug. 13, 2020

(65) Prior Publication Data

US 2020/0374075 A1 Nov. 26, 2020

Related U.S. Application Data

(63) Continuation of application No. PCT/CN2018/086491, filed on May 11, 2018.

(30) Foreign Application Priority Data

Feb. 14, 2018 (WO) ............... PCT/CN2018/076878

(51) Int. Cl.
*H04L 5/00* (2006.01)
*H04L 1/00* (2006.01)
(Continued)

(52) U.S. Cl.
CPC .......... *H04L 5/0048* (2013.01); *H04L 1/0026* (2013.01); *H04L 1/1861* (2013.01); *H04L 5/0007* (2013.01); *H04W 72/0453* (2013.01)

(58) Field of Classification Search
CPC .. H04J 11/005; H04J 13/0025; H04J 13/0029; H04J 13/10; H04L 1/0026;
(Continued)

(56) References Cited

U.S. PATENT DOCUMENTS

2010/0195566 A1 8/2010 Krishnamurthy et al.
2012/0063371 A1 3/2012 He et al.
(Continued)

FOREIGN PATENT DOCUMENTS

CN 101877865 A 11/2010
CN 101895486 A 11/2010
(Continued)

OTHER PUBLICATIONS

3rd Generation Partnership Project; Technical Specification Group Radio Access Network; Evolved Universal Terrestrial Radio Access (E-UTRA); Physical channels and modulation (Release 14), 3GPP TS 36.211 V14.4.0 (Sep. 2017), 197 pages.
(Continued)

*Primary Examiner* — Mansour Oveissi
(74) *Attorney, Agent, or Firm* — Slater Matsil, LLP

(57) ABSTRACT

This application provides a reference signal sequence transmission method. The method includes: generating a reference signal sequence based on a frame number of a radio frame; mapping at least a part of reference signals in the reference signal sequence to a resource position that corresponds to the radio frame and that is used to transmit the at least a part of reference signals; and sending the at least a part of reference signals or an orthogonal reference signal at the resource position, where the orthogonal reference signal is obtained by multiplying the at least a part of reference signals by a preset orthogonal code.

20 Claims, 6 Drawing Sheets

(51) Int. Cl.
*H04L 1/18* (2006.01)
*H04W 72/04* (2009.01)

(58) Field of Classification Search
CPC . H04L 1/1861; H04L 27/2613; H04L 5/0007; H04L 5/0048; H04L 5/005; H04W 72/0453
See application file for complete search history.

(56) References Cited

U.S. PATENT DOCUMENTS

| | | | |
|---|---|---|---|
| 2015/0003356 A1 | 1/2015 | Seo et al. | |
| 2015/0085793 A1* | 3/2015 | Luo | H04W 16/14 370/329 |
| 2015/0189677 A1 | 7/2015 | Han et al. | |
| 2018/0076866 A1* | 3/2018 | Chen | H04B 7/06 |
| 2020/0154239 A1* | 5/2020 | Yamada | G01S 1/20 |
| 2021/0007065 A1* | 1/2021 | Ko | H04W 56/00 |

FOREIGN PATENT DOCUMENTS

| | | |
|---|---|---|
| CN | 102780532 A | 11/2012 |
| CN | 104639492 A | 5/2015 |
| CN | 105556887 A | 5/2016 |
| CN | 107534541 A | 1/2018 |
| CN | 107682137 A | 2/2018 |
| GN | 101800572 A | 8/2010 |
| WO | 2010117116 A1 | 10/2010 |
| WO | 2017151876 A1 | 9/2017 |

OTHER PUBLICATIONS

3rd Generation Partnership Project; Technical Specification Group Radio Access Network; Evolved Universal Terrestrial Radio Access (E-UTRA); Physical channels and modulation (Release 15), 3GPP TS 36.211 V15.0.0 (Dec. 2017), 219 pages.

3rd Generation Partnership Project; Technical Specification Group Radio Access Network; Evolved Universal Terrestrial Radio Access (E-UTRA); LTE Positioning Protocol (LPP) (Release 14), 3GPP TS 36.355 V14.1.0 (Mar. 2017), 164 pages.

Huawei et al., "Way forward on NPRS sequence generation", 3GPP TSG RAN WG1 Meeting #87, R1-1613214, Reno, Nevada, US, Nov. 14-18, 2016, 3 pages.

Huawei et al., "Design of new downlink positioning reference signal for NB-IoT", 3GPP TSG RAN WG1 Meeting #86bis, R1-1608618, Lisbon, Portugal, Oct. 10-14, 2016, 7 pages.

Huawei et al., "Design of downlink positioning reference signal for NB-IoT", 3GPP TSG RAN WG1 Meeting #87, R1-1611143, Reno, NV, US, Nov. 14-18, 2016, 4 pages.

* cited by examiner

REFERENCE SIGNAL TRANSMISSION METHOD AND DEVICE

CROSS-REFERENCE TO RELATED APPLICATIONS

This application is a continuation of International Application No. PCT/CN2018/086491, filed on May 11, 2018, which claims priority to International Application No. PCT/CN2018/076878, filed on Feb. 14, 2018. The disclosures of the aforementioned applications are hereby incorporated by reference in their entireties.

TECHNICAL FIELD

This application relates to the communications field, and more specifically, to a reference signal transmission method and a device.

BACKGROUND

In an existing communications system, when a sending device sends data to a receiving device, due to impact of a radio channel and impact of a non-ideal factor, such as a transmission delay, a carrier frequency offset, a sampling clock offset, and a crystal oscillator frequency drift caused by a temperature, data received by the receiving device is distorted compared with the data sent by the sending device. To enable the receiving device to recover the original data from the distorted data, it is necessary to know channel information and information about the non-ideal factor to compensate for the distortion of the received data. In the existing communications system, the information is generally obtained in a manner in which the sending device sends, to the receiving device, a signal that is learned by both the sending device and the receiving device in advance. The signal is referred to as a reference signal or a pilot.

A plurality of reference signals with different functions are defined in an existing wireless communications system. For example, a narrowband reference signal (NRS) and a narrowband positioning reference signal (NPRS) are defined in a narrowband internet of things (NB-IoT) system. A cell-specific reference signal (CRS), a terminal-device-specific reference signal associated with a physical downlink shared channel (PDSCH), a positioning reference signal (PRS), a channel state information-reference signal (CSI-RS), and the like are defined in a long term evolution (LTE) system. A demodulation reference signal (DMRS), a CSI-RS, a phase tracking reference signal (PTRS), and the like for different physical channels are defined in a new radio (NR) system. These reference signals are generated based on a pseudo-random sequence.

FIG. 1 shows three mapping patterns of the NPRS in one subframe. In view of in-band deployment, antenna port quantities, being 1, 2 and 4, for a physical broadcast channel (PBCH) correspond to two different mapping patterns. It can be learned from FIG. 1 that, for mapping patterns in three scenarios, in one OFDM symbol, the NPRS has only six different frequency position offset modes, and a frequency shift is determined according to $N_{ID}^{NPRS}$ mod 6. However, the NB-IoT system supports a maximum of 4096 cell identifiers $N_{ID}^{NPRS}$. Therefore, for the receiving device, at a same moment, frequency offset positions of NPRSs received from two sending devices may be the same.

For two intra-frequency cells, for example, a cell 1 and a cell 2, the cell 1 generates and sends an NPRS in any manner shown in FIG. 1, the cell 2 also generates and sends an NPRS in a manner the same as that of the cell 1, and frequency offset positions of the NPRSs of the cell 1 and the cell 2 are the same. If the cell 1 is a target cell and the cell 2 is an interfering cell, the NPRS sent by the cell 2 causes interference to the NPRS sent by the cell 1. For the cell 1, NPRS sequences in any two radio frames are the same. For the cell 2, NPRS sequences in any two radio frames are also the same.

In an enhanced coverage scenario, the NPRSs of the cell 1 and the cell 2 are sent in a plurality of consecutive radio frames. After receiving the NPRS sent by the cell 1 (the target cell), the receiving device processes the NPRSs in the radio frames and then performs in-phase combination on the NPRSs in the radio frames, and also performs in-phase combination on the received NPRS of the cell 2 (the interfering cell). Consequently, an increase in interference power is caused.

For the foregoing reference signals of other types, the foregoing problem also exists when reference signals in a plurality of radio frames are combined.

SUMMARY

This application provides a reference signal transmission method to improve inter-cell interference randomization performance.

According to a first aspect, a reference signal sequence transmission method is provided. The method includes: generating a reference signal sequence based on a frame number of a radio frame; mapping at least a part of reference signals in the reference signal sequence to a resource position that corresponds to the radio frame and that is used to transmit the at least a part of reference signals; and sending the at least a part of reference signals at the resource position or sending an orthogonal reference signal at the resource position, where the orthogonal reference signal is obtained by multiplying the at least a part of reference signals by a preset orthogonal code.

In the foregoing method, when the reference signal sequence is generated, the reference signal sequence is generated based on the frame number of the radio frame, so that reference signal sequences in any two radio frames in an interfering cell are different. Therefore, interference caused by a reference signal of the interfering cell to a reference signal of a target cell can be reduced.

Specifically, when a receiving device receives, from the target cell, reference signals in a plurality of radio frames in the target cell, the receiving device needs to perform combination processing on the reference signals of the target cell. When receiving the reference signals of the target cell, the receiving device usually also receives, from the interfering cell, reference signals in a plurality of radio frames in the interfering cell. Correspondingly, the receiving device performs combination processing on the received reference signals, and the combination processing also includes combination processing on the reference signals of the interfering cell. For combining, by the receiving device, the reference signals in the plurality of radio frames in the target cell, because a manner of generating the reference signals of the target cell is known to the receiving device, the receiving device may generate the reference signals in the receiving device, the combination is combination performed after the receiving device processes, in each radio frame, the received reference signals of the target cell and the reference signals generated in the receiving device. Therefore, the combination does not cause these reference signals of the target cell to be canceled by each other. For combining, by the receiving device, the reference signals in the plurality of radio frames in the interfering cell, because the reference signal sequences in any two radio frames in the interfering cell are different, and the reference signals of the interfering cell are unknown to the receiving device, these reference signals of the interfering cell may be canceled by each other as much as possible, so that interference caused by the reference signal of the interfering cell to the reference signal of the target cell can be reduced.

In an optional implementation, the foregoing resource position may be one or more resource elements (RE) on one symbol, and the one or more REs may be distributed in at least one resource block (resource block, RB) or distributed in a plurality of RBs.

In an optional implementation, the one or more REs may alternatively be distributed in at least one or more resource units. Any resource unit in the one or more resource units may be a resource unit including one or more time units in time domain and one or more frequency domain units in frequency domain, or any resource unit may be a resource unit including one or more neighboring frequency domain units in frequency domain. The time domain unit may be a symbol, a slot, a subframe, a radio frame, a superframe, or the like. The frequency domain unit may be a subcarrier, a carrier, a frequency band, or the like. Different time domain units may be consecutive or discrete, and different frequency domain units may be consecutive or discrete.

In an optional implementation, the foregoing symbol includes but is not limited to an orthogonal frequency division multiplexing (OFDM) symbol, a sparse code multiple access (SCMA) symbol, a filtered orthogonal frequency division multiplexing (F-OFDM) symbol, or a non-orthogonal multiple access (NOMA) symbol. A type of the symbol may be specifically determined based on an actual situation.

In an optional implementation, the generating a reference signal sequence based on a frame number of a radio frame includes: generating a pseudo-random sequence; and generating the reference signal sequence based on at least a part of sequences in the pseudo-random sequence, where an index of the at least a part of sequences corresponds to the frame number of the radio frame.

At least a part of reference signals are selected from the pseudo-random sequence based on the frame number of the radio frame, and the reference signal sequence is generated based on the at least a part of reference signals, so that the at least a part of reference signals selected from the pseudo-random sequence based on radio frames with different frame numbers are different. In this way, reference signal sequences in any two radio frames in each cell are different, so that when the receiving device performs in-phase combination on the received reference signal sequences in the plurality of radio frames, interference caused by the reference signal of the interfering cell to the reference signal of the target cell is reduced.

In an optional implementation, the reference signal sequence $r_{l,n_s}(m)$ meets the following formula $$r_{l,n_s}(m) = \frac{1}{\sqrt{2}}(1 - 2 \cdot c(2m+L)) + j\frac{1}{\sqrt{2}}(1 - 2 \cdot c(2m+1+L)),$$

$$m = 0, 1, \ldots, N_{RE} \cdot N_{RB} - 1$$

$$L = 2N_{RE} \cdot N_{RB} \cdot n_f,$$

where $n_f$ is the frame number of the radio frame, $N_{RB}$ is a quantity of resource blocks (RBs), $N_{RE}$ is a quantity of resource elements REs, $n_s$ is an index of any slot in the radio frame, and l is an index of any symbol in the slot; and c(2m+L) and c(2m+1+L) are the at least a part of sequences in the pseudo-random sequence generated based on an initialization seed, (2m+L) and (2m+1+L) are indexes of the at least a part of sequences, and the initialization seed is determined based on at least one of $n_s$, l, an index of any subframe in the radio frame, a cell identifier, a radio network temporary identifier (radio network temporary identity, RNTI), an identifier of a cyclic prefix (cyclic prefix, CP), a reference signal identifier, a channel identifier, a subcarrier identifier, and a carrier identifier.

In an optional implementation, the generating a reference signal sequence based on a frame number of a radio frame includes: performing a modulo operation on the frame number of the radio frame based on a preset value K, where K is a positive integer; and generating the reference signal sequence based on a value resulting from the frame number of the radio frame mod K.

The reference signal sequence is generated based on the value resulting from the frame number of the radio frame mod K, so that reference signal sequences in radio frames in which any two values resulting from performing a modulo operation by using the preset value K are different in each cell are different. Therefore, when the receiving device performs in-phase combination on the received reference signal sequences in the plurality of radio frames, interference caused by the reference signal of the interfering cell to the reference signal of the target cell is reduced.

In an optional implementation, the generating a reference signal sequence based on a frame number of a radio frame includes: generating a pseudo-random sequence; and generating the reference signal sequence based on at least a part of sequences in the pseudo-random sequence, where an index of the at least a part of sequences corresponds to a value resulting from the frame number of the radio frame mod K.

At least a part of reference signals are selected from the pseudo-random sequence based on the value resulting from the frame number of the radio frame mod K, and the reference signal sequence is generated based on the at least a part of reference signals, so that the at least a part of reference signals selected from the pseudo-random sequence based on different values resulting from performing a modulo operation by using K are different, and further, reference signal sequences in radio frames in which any two values resulting from performing a modulo operation by using the preset value K are different in each cell are different. Therefore, when the receiving device performs in-phase combination on the received reference signal sequences in the plurality of radio frames, interference caused by the reference signal of the interfering cell to the reference signal of the target cell is reduced.

In an optional implementation, the reference signal sequence $r_{l,n_s}(m)$ meets the following formula:

$$r_{l,n_s}(m) = \frac{1}{\sqrt{2}}(1 - 2 \cdot c(2m+L)) + j\frac{1}{\sqrt{2}}(1 - 2 \cdot c(2m+1+L)),$$

$$m = 0, 1, \ldots, N_{RE} \cdot N_{RB} - 1$$

$$L = 2N_{RE} \cdot N_{RB} \cdot (n_f \bmod K),$$

where $n_f$ is the frame number of the radio frame, $N_{RB}$ is a quantity of resource blocks, $N_{RE}$ is a quantity of resource elements REs, $n_s$ is an index of any slot in the radio frame, and l is an index of any symbol in the slot; and c(2m+L) and c(2m+1+L) are the at least a part of sequences in the pseudo-random sequence generated based on an initialization seed, (2m+L) and (2m+1+L) are indexes of the at least a part of sequences, $n^{rf}$ mod K is the value resulting from the frame number of the radio frame mod K, and the initialization seed is determined based on at least one of $n_s$, l, an index of any subframe in the radio frame, a cell identifier, a radio network temporary identifier RNTI, an identifier of a cyclic prefix CP, a reference signal identifier, a channel identifier, a subcarrier identifier, and a carrier identifier.

In an optional implementation, the generating a reference signal sequence based on a frame number of a radio frame includes: generating a pseudo-random sequence based on the frame number of the radio frame; and generating the reference signal sequence based on the pseudo-random sequence.

The pseudo-random sequence is generated based on the frame number of the radio frame, and the reference signal sequence is generated based on the pseudo-random sequence, so that reference signal sequences in any two radio frames in each cell are different. Therefore, when the receiving device performs in-phase combination on the received reference signal sequences in the plurality of radio frames, interference caused by the reference signal of the interfering cell to the reference signal of the target cell is reduced.

In an optional implementation, the generating a pseudo-random sequence based on the frame number of the radio frame includes: determining an initialization seed of the pseudo-random sequence based on a first parameter set, where the first parameter set includes the frame number of the radio frame or a value resulting from the frame number of the radio frame mod K, and K is a positive integer; and generating the pseudo-random sequence based on the initialization seed.

The initialization seed of the pseudo-random sequence is generated based on the frame number of the radio frame or the value resulting from the frame number of the radio frame mod K. Then, the pseudo-random sequence is generated based on the initialization seed to make randomized sequences generated based on frame numbers of different radio frames different, or to make pseudo-random sequences generated based on different values resulting from the frame number of the radio frame mod K different, and finally, to make reference signal sequences generated based on the frame numbers of different radio frames or different values resulting from the frame number of the radio frame mod K different. Therefore, when the receiving device performs in-phase combination on the received reference signal sequences in the plurality of radio frames, interference caused by the reference signal of the interfering cell to the reference signal of the target cell is reduced.

In an optional implementation, the reference signal sequence $r_{l,n_s}(m)$ meets the following formula:

$$r_{l,n_s}(m) = \frac{1}{\sqrt{2}}(1 - 2 \cdot c(2m + L)) + j\frac{1}{\sqrt{2}}(1 - 2 \cdot c(2m + 1 + L)),$$

$$m = 0, 1, \ldots, N_{RE} \cdot N_{RB} - 1$$

$$L = 2N_{RE} \cdot N_{RB} \cdot (N_{symb} \cdot n_s + l),$$

where $N_{RB}$ is a quantity of resource blocks RBs, $N_{RE}$ is a quantity of resource elements REs, $N_{symb}$ is a quantity of symbols in any slot, $n_s$ is an index of any slot in the radio frame, and l is an index of any symbol in the slot; and c(2m+L) and c(2m+1+L) are at least a part of sequences in the pseudo-random sequence generated based on the initialization seed.

In an optional implementation, the first parameter set further includes at least one of an index of any subframe in the radio frame, a cell identifier, a radio network temporary identifier RNTI, an identifier of a cyclic prefix CP, a reference signal identifier, a channel identifier, a subcarrier identifier, and a carrier identifier.

In an optional implementation, the pseudo-random sequence is a Gold sequence.

According to a second aspect, a reference signal transmission method is provided. The method includes: generating a reference signal sequence; determining a first index set based on a frame number of a radio frame, where the first index set is used to indicate at least a part of reference signals in the reference signal sequence; mapping the at least a part of reference signals to a resource position that corresponds to the radio frame and that is used to transmit the at least a part of reference signals; and sending the at least a part of reference signals at the resource position or sending an orthogonal reference signal at the resource position, where the orthogonal reference signal is obtained by multiplying the at least a part of reference signals by a preset orthogonal code.

An index of a reference signal that needs to be sent to a receiving device is determined in the generated reference signal sequence based on the frame number of the radio frame, so that indexes of reference signals that need to be sent to the receiving device and that are determined in the reference signal sequence based on different frame numbers of radio frames are different. In this way, reference signals in radio frames that have different frame numbers and that are sent to the receiving device are different, so that when the receiving device performs in-phase combination on received reference signal sequences in a plurality of radio frames, interference caused by a reference signal of an interfering cell to a reference signal of a target cell is reduced.

In an optional implementation, the determining a first index set based on a frame number of a radio frame includes: performing a modulo operation on the frame number of the radio frame based on a preset value K, where K is a positive integer; and determining the first index set based on a value resulting from the frame number of the radio frame mod K.

The index of the reference signal that needs to be sent to the receiving device is determined in the generated reference signal sequence based on the value resulting from the frame number of the radio frame mod K, so that indexes of reference signals that need to be sent to the receiving device and that are determined in the reference signal sequence based on different values resulting from the frame number of the radio frame mod K are different. In this way, reference signals that are sent to the receiving device and that are in radio frames in which different values result from the frame number of the radio frame mod K are different, so that when the receiving device performs in-phase combination on the received reference signal sequences in the plurality of radio frames, interference caused by the reference signal of the interfering cell to the reference signal of the target cell is reduced.

According to a third aspect, a reference signal transmission method is provided. The method includes: generating, by a receiving device, a reference signal sequence; determining, by the receiving device, a resource position, where the resource position is a resource position that corresponds to a radio frame and that is used to transmit at least a part of reference signals; and receiving, by the receiving device at the resource position, the at least a part of reference signals sent by a sending device, or receiving, by the receiving device at the resource position, an orthogonal reference signal, where the orthogonal reference signal is obtained by multiplying the at least a part of reference signals by a preset orthogonal code.

According to a fourth aspect, a communications apparatus is provided. The communications apparatus is configured to perform the reference signal transmission method according to any one of the first aspect or the possible implementations of the first aspect. Specifically, the communications apparatus may include modules configured to perform the reference signal transmission method according to any one of the first aspect or the possible implementations of the first aspect.

In an optional implementation, the communications apparatus is further configured to perform the reference signal transmission method according to any one of the second aspect or the possible implementations of the second aspect. Specifically, the communications apparatus may include modules configured to perform the reference signal transmission method according to any one of the second aspect or the possible implementations of the second aspect.

According to a fifth aspect, a communications apparatus is provided. The communications apparatus is configured to perform the reference signal transmission method according to any one of the third aspect or the possible implementations of the third aspect. Specifically, the communications apparatus may include modules configured to perform the reference signal transmission method according to any one of the third aspect or the possible implementations of the third aspect.

According to a sixth aspect, a communications device is provided. The communications device includes a processor and a memory, and the processor is configured to invoke a program stored in the memory, to perform the reference signal transmission method according to any one of the first aspect or the possible implementations of the first aspect.

In an optional implementation, the communications device is further configured to perform the reference signal transmission method according to any one of the second aspect or the possible implementations of the second aspect.

According to a seventh aspect, a communications device is provided. The communications device includes a processor and a memory, and the processor is configured to invoke a program stored in the memory, to perform the reference signal transmission method according to any one of the third aspect or the possible implementations of the third aspect.

According to an eighth aspect, a computer-readable storage medium is provided. The computer-readable storage medium stores a computer program, and when the program is executed by a processor, the method according to any one of the first aspect or the possible implementations of the first aspect is implemented.

In an optional implementation, the computer-readable storage medium is further configured to perform the reference signal transmission method according to any one of the second aspect or the possible implementations of the second aspect.

According to a ninth aspect, a computer-readable storage medium is provided. The computer-readable storage medium stores a computer program, and when the program is executed by a processor, the method according to any one of the third aspect or the possible implementations of the third aspect is implemented.

According to a tenth aspect, a computer program product is provided. The computer program product includes computer program code. When the computer program code is run by a processing unit or a processor of a communications device, the communications device is enabled to perform the method according to the first aspect.

In an optional implementation, when the computer program code is run by the processing unit or the processor of the communications device, the communications device is enabled to perform the method according to the second aspect.

According to an eleventh aspect, a computer program product is provided. The computer program product includes computer program code. When the computer program code is run by a processing unit or a processor of a communications device, the communications device is enabled to perform the method according to the third aspect.

According to a twelfth aspect, a chip system is provided. The chip system includes a processor, configured to support a communications device in implementing the method according to the first aspect.

In an optional implementation, the processor is further configured to support the communications device in implementing the method according to the second aspect.

According to a thirteenth aspect, a chip system is provided. The chip system includes a processor, configured to support a communications device in implementing the method according to the third aspect.

DETAILED DESCRIPTION OF ILLUSTRATIVE EMBODIMENTS

Figure 1:
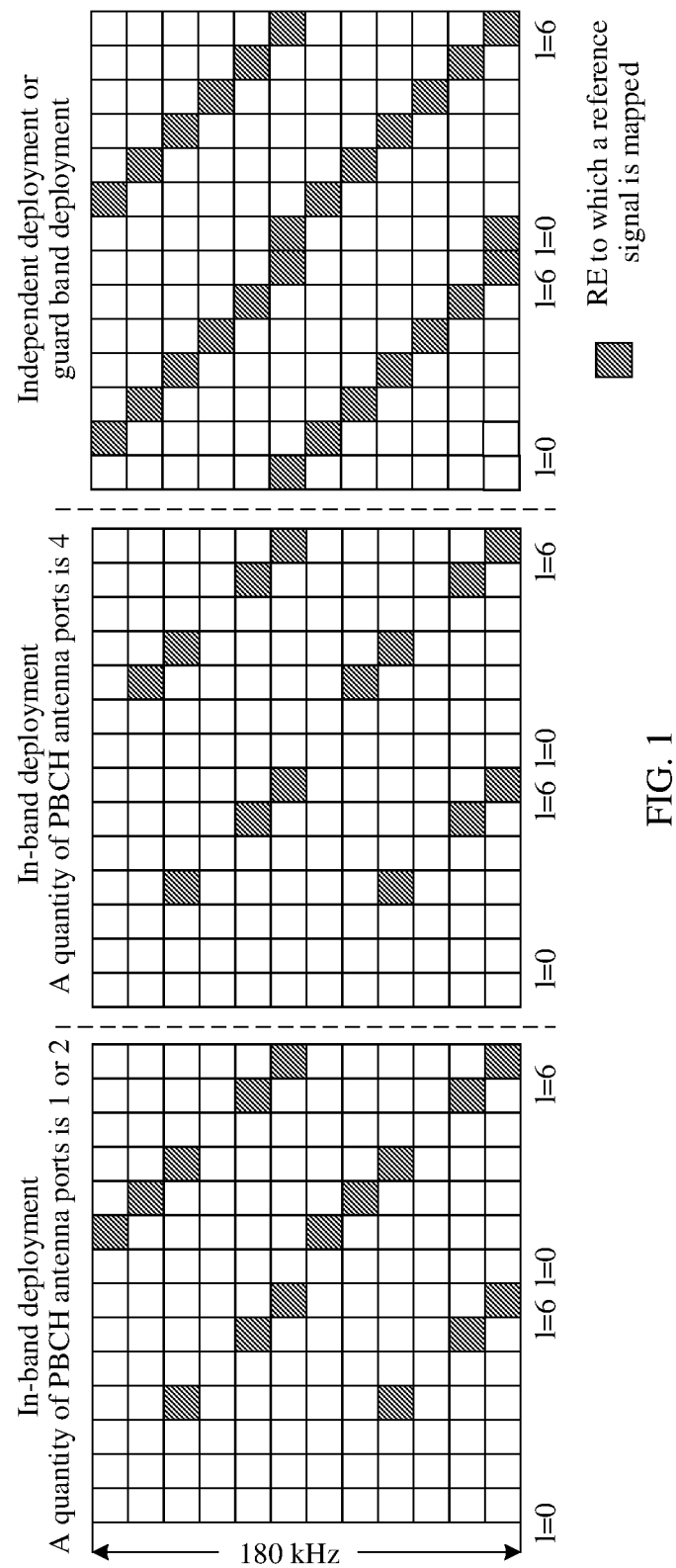
FIG. 1 is a mapping pattern of an NPRS in a subframe.

The following describes technical solutions of this application with reference to the accompanying drawings.

The technical solutions in the embodiments of this application may be applied to various wireless communications systems, for example, a long term evolution (LTE) system, a long term evolution-advanced (LTE-A) system, and a future 5th generation (5G) system or new radio (NR) system.

A terminal device in the embodiments of this application is a device having wireless transmission and reception functions, and may be deployed on land, where the deployment includes indoor or outdoor, handheld, wearable, or vehicle-mounted deployment, may be deployed on water (for example, on a ship), or may be deployed in air (for example, on an aircraft, a balloon, and a satellite). The terminal device may be a mobile phone, a tablet (Pad), a computer having wireless transmission and reception functions, a virtual reality (VR) terminal device, an augmented reality (AR) terminal device, a wireless terminal in industrial control, a wireless terminal in unmanned driving (self driving), a wireless terminal in telemedicine (remote medical), a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. An application scenario is not limited in the embodiments of this application. The terminal device sometimes may also be referred to as user equipment (UE), an access terminal device, a UE unit, a UE station, a mobile radio station, a mobile station, a remote station, a remote terminal device, a mobile device, a UE terminal device, a terminal device, a terminal, a wireless communications device, a UE agent, a UE apparatus, or the like.

A network device in the embodiments of this application may be a device configured to communicate with the terminal device. The network device may be any device having wireless transmission and reception functions, and includes but is not limited to a base station (for example, a NodeB, an evolved NodeB (eNodeB), a network device in a 5th generation (5G) communications system, a network device in a future communications system, an access node in a Wi-Fi system, a wireless relay node, or a wireless backhaul node), and the like. The network device may alternatively be a radio controller in a cloud radio access network (CRAN) scenario. The network device may alternatively be a network device in a 5G network or a network device in a future evolved network, a wearable device, a vehicle-mounted device, or the like. The network device may alternatively be a small cell, a transmission reference node (TRP), or the like. Certainly, this application is not limited thereto.

Figure 2:
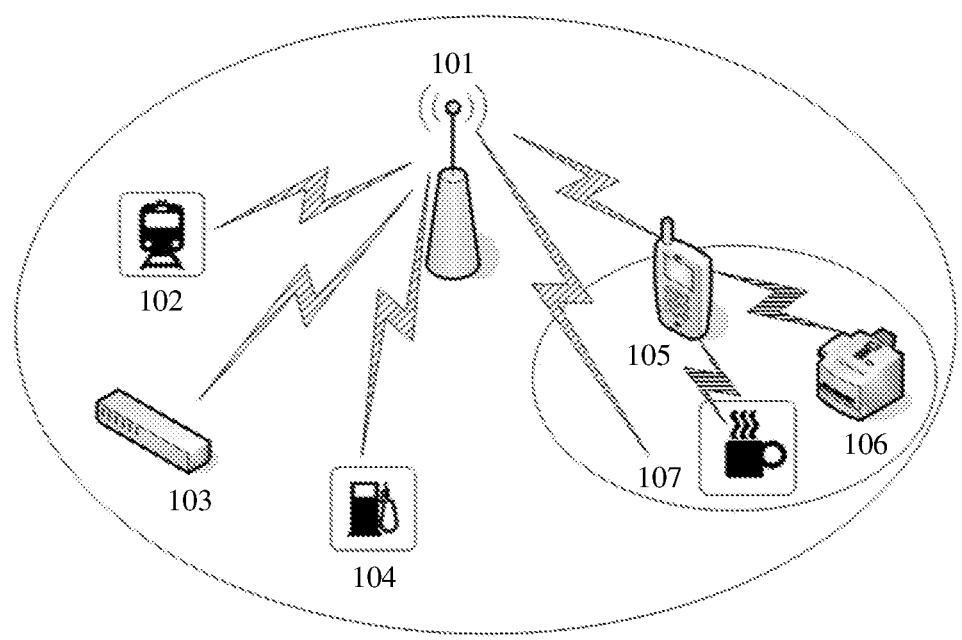
FIG. 2 is a schematic architecture diagram of a system according to an embodiment of this application.

FIG. 2 is a schematic diagram of a wireless communications system according to an embodiment of this application. As shown in FIG. 2, the communications system 100 includes a network device 101, a terminal device 102, a terminal device 103, a terminal device 104, a terminal device 105, and a terminal device 106.

The network device 101 may send information to any one of the terminal device 101 to the terminal device 106. In addition, the terminal device 104, the terminal device 105, and the terminal device 106 can also form a communications system. In the communications system, the terminal device 105 may send information to at least one of the terminal device 104 and the terminal device 106.

Figure 3:
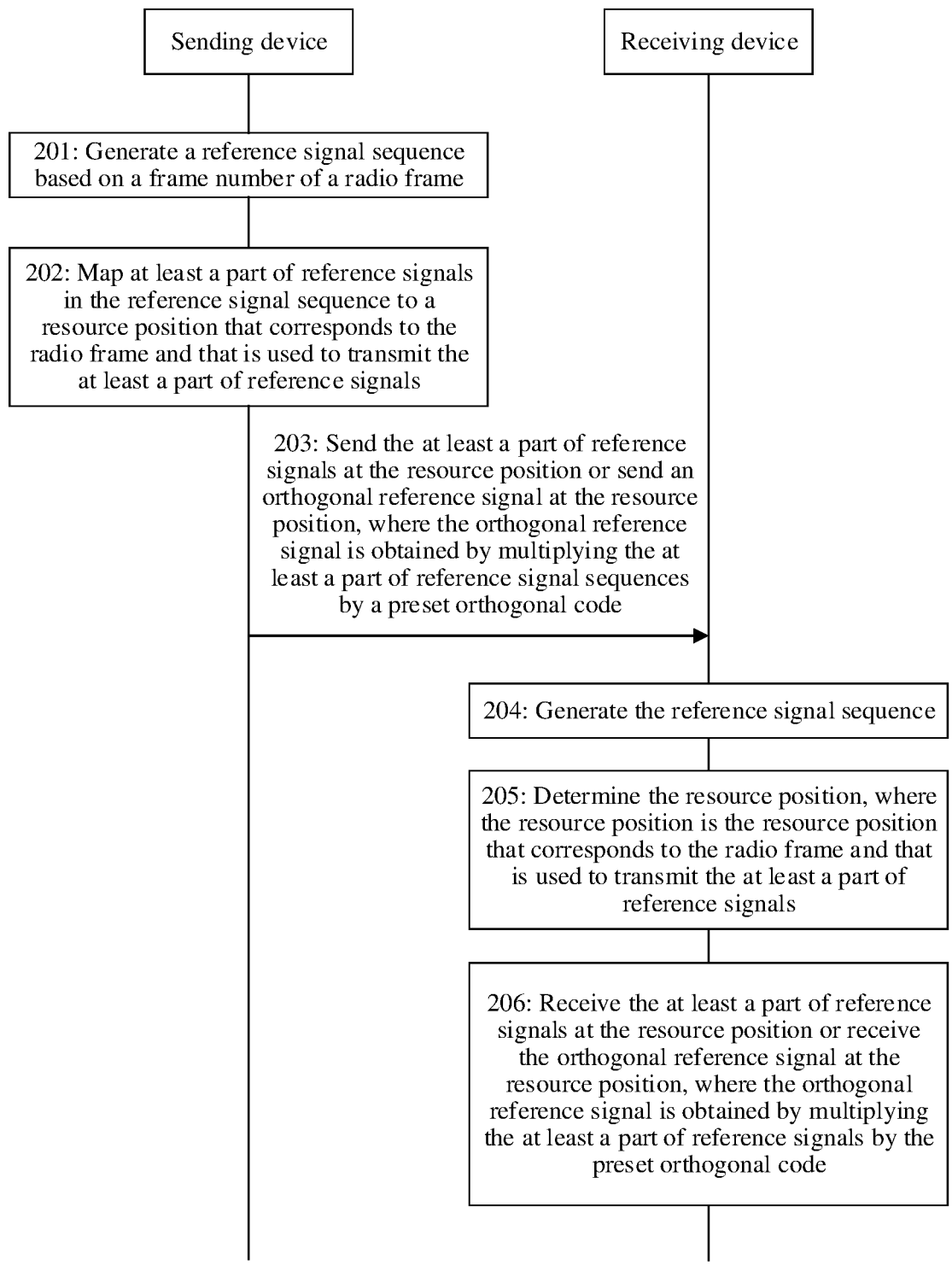
FIG. 3 is a schematic flowchart of a reference signal transmission method according to an embodiment of this application.

FIG. 3 is a schematic flowchart of a reference signal transmission method 200 according to an embodiment of this application.

In downlink transmission, a sending device in FIG. 3 may be the network device 101 in FIG. 2, and a receiving device may be any one of the terminal device 101 to the terminal device 106 in FIG. 2. In uplink transmission, a sending device in FIG. 3 may be any one of the terminal device 101 to the terminal device 106 in FIG. 2, and a receiving device may be the network device in FIG. 2. Certainly, a quantity of network devices and a quantity of terminal devices in an actual system may not be limited to an example in this embodiment or another embodiment. Details are not described below again. The method 200 includes at least the following steps.

201: Generate a reference signal sequence based on a frame number of a radio frame.

Specifically, when generating the reference signal sequence, the sending device introduces the frame number of the radio frame, so that the generated reference signal sequence is associated with the frame number of the radio frame.

202: Map at least a part of reference signals in the reference signal sequence to a resource position that corresponds to the radio frame and that is used to transmit the at least a part of reference signals.

Specifically, the sending device determines the resource position that carries a reference signal in the reference signal sequence, maps the at least a part of reference signals in the reference signal sequence to the determined resource position, and sends the at least a part of reference signals to the receiving device at the resource position.

When the sending device is the terminal device, the resource position used to transmit the reference signal may be determined in the following manner:

The resource position used to transmit the reference signal may be agreed on, or may be determined by using a configuration parameter of the network device. For example, the network device may notify the terminal device of a corresponding parameter by using any type of information in a system message, radio resource control (RRC) signaling, a media access control (MAC) control element (CE), or downlink control information (DCI).

For example, when the frame number of the radio frame is 5, the network device maps two reference signals in the reference signal sequence generated based on the frame number of the radio frame to two REs on a symbol in the radio frame whose frame number is 5, and sends the two reference signals to the terminal device on the two REs. The two REs are resource positions used to transmit the reference signals.

By way of example and not limitation, the foregoing symbol includes but is not limited to an orthogonal frequency division multiplexing (OFDM) symbol, a sparse code multiple access (SCMA) symbol, a filtered orthogonal frequency division multiplexing (F-OFDM) symbol, or a non-orthogonal multiple access (NOMA) symbol. A type of the symbol may be specifically determined based on an actual situation.

203: Send the at least a part of reference signals or an orthogonal reference signal at the resource position, where the orthogonal reference signal is obtained by multiplying the at least a part of reference signals by a preset orthogonal code.

Specifically, the sending device may send the at least a part of reference signals to the receiving device at the resource position. Alternatively, the sending device may multiply the at least a part of reference signals by the orthogonal code, and send, to the receiving device, a reference signal (for example, the orthogonal reference signal) obtained by multiplying the at least a part of reference signals by the orthogonal code.

In an optional implementation, the foregoing resource position may be one or more resource elements REs on one symbol.

In an optional implementation, the one or more REs may alternatively be distributed in at least one or more resource units. Any resource unit in the one or more resource units may be a resource unit including one or more time units in time domain and one or more frequency domain units in frequency domain, or any resource unit may be a resource unit including one or more neighboring frequency domain units in frequency domain. The time domain unit may be a symbol, a slot, a subframe, a radio frame, a superframe, or the like. The frequency domain unit may be a subcarrier, a carrier, a frequency band, or the like. Different time domain units may be consecutive or discrete, and different frequency domain units may be consecutive or discrete. A quantity of time domain units and a quantity of frequency domain units may be agreed on. A position of one resource element RE is determined by using an index of any time domain unit and an index of any frequency domain unit.

In an optional implementation, the one or more REs may be distributed in at least one resource block RB or distributed in a plurality of RBs.

For example, in an LTE system, for downlink transmission, any RB includes $N_{symb}^{DL}$ consecutive orthogonal frequency division multiplexing (OFDM) symbols in time domain and $N_{sc}^{RB}$ consecutive subcarriers in frequency domain. For uplink transmission, an RB includes $N_{symb}^{UL}$ consecutive sparse code multiple access (SCMA) symbols in time domain and $N_{sc}^{RB}$ consecutive subcarriers in frequency domain. $N_{sc}^{RB}=12$, and in a normal CP, $N_{symb}^{DL}=7$ and $N_{symb}^{UL}=7$; and in an extended CP, $N_{symb}^{DL}=6$ and $N_{symb}^{UL}=6$.

In an NR system, any RB includes 12 consecutive subcarriers in frequency domain.

In an NB-IoT system, for downlink transmission, a definition of any RB is the same as that of the RB in the LTE system. For uplink transmission, any RB may be a resource unit, and the resource unit includes $N_{symb}^{UL}$ consecutive SC-FDMA symbols in time domain and $N_{sc}^{RU}$ consecutive subcarriers in frequency domain. $N_{symb}^{UL}$, $N_{slots}^{UL}$, and $N_{sc}^{RU}$ are agreed on in a protocol. For details, refer to Table 10.1.2.3-1 in the 3rd generation partnership project (3rd generation partnership project, 3GPP) TS36.211 14.4.0 version. This is not specifically limited in this embodiment of this application.

Figure 4:
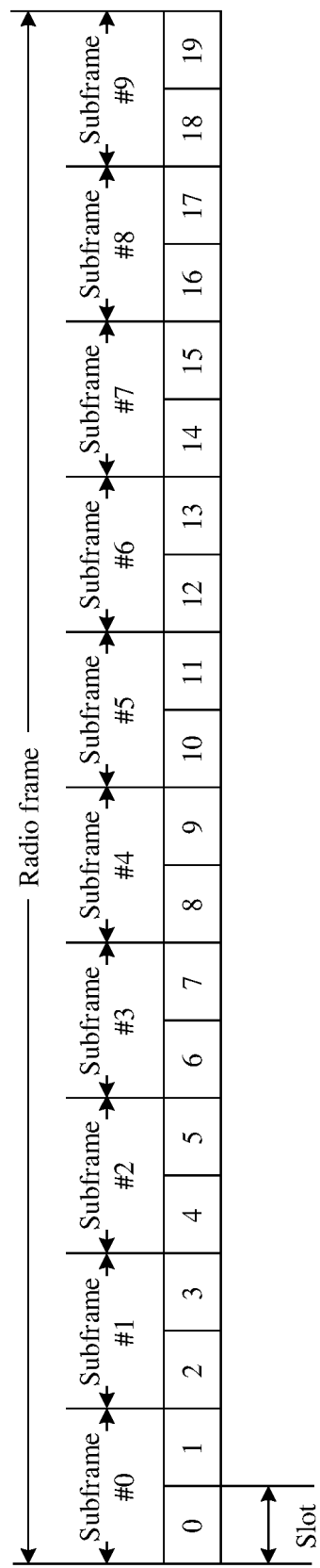
FIG. 4 is a schematic diagram of a frame structure of a radio frame in an LTE system.

In the LTE system, a frame structure of a radio frame is shown in FIG. 4. One radio frame includes 10 subframes, one subframe includes two slots, time duration of one subframe is 1 ms, and time duration of one slot is 0.5 ms.

In time domain, one slot includes a plurality of symbols. In a normal subframe of 3GPP LTE, when a type of the CP is a normal CP, one uplink slot or one downlink slot includes seven symbols; and when a type of the CP is an extended CP, one uplink slot or one downlink slot includes six symbols.

In the NB-IoT system, duration of one radio frame is 10 ms. For downlink, a frame structure is the same as that in LTE. For uplink, when a subcarrier bandwidth is 15 kHz, one radio frame has 20 slots. For a 3.75 kHz subcarrier bandwidth, one radio frame has five slots.

In the NR system, time duration of one radio frame is 10 ms, time duration of one subframe is 1 ms, and a quantity of slots in one subframe is related to a subcarrier bandwidth.

For example, when the subcarrier bandwidth is 15 kHz, one subframe includes one slot; and when the subcarrier bandwidth is 30 kHz, one subframe includes two slots. A quantity of symbols in a slot is related to a type of the CP. When the type of the CP is a normal CP, one uplink slot or one downlink slot includes 14 symbols. When the type of the CP is an extended CP, one uplink slot or one downlink slot includes 12 symbols.

It should be understood that the foregoing illustrated structure of the radio frame is merely an example. A quantity of subframes included in the radio frame, a quantity of slots included in the subframe, or a quantity of symbols included in the slot may be modified in various manners.

When the reference signal sequence is generated, the reference signal sequence is generated based on the frame number of the radio frame, so that reference signal sequences in any two radio frames in each cell are different. Therefore, when the receiving device performs in-phase combination on received reference signal sequences in a plurality of radio frames, interference caused by a reference signal of an interfering cell to a reference signal of a target cell is reduced.

A method for generating a narrowband positioning reference signal (NPRS) sequence in a narrowband internet of things (NB-IoT) is used as an example below, and an example in which the resource block is an RB is used to describe the method for generating the reference signal sequence in this embodiment of this application.

Method 1

By way of example and not limitation, the generating, by a sending device, a reference signal sequence based on a frame number of a radio frame includes: generating a pseudo-random sequence; and generating the reference signal sequence based on at least a part of sequences in the pseudo-random sequence, where an index of the at least a part of sequences corresponds to the frame number of the radio frame.

Specifically, in the NB-IoT system, for the NPRS, the pseudo-random sequence is a Gold sequence. The sending device first generates the Gold sequence, then selects the at least a part of sequences from the Gold sequence based on the frame number of the radio frame, and generates the reference signal sequence based on the at least a part of sequences.

For example, the reference signal sequence $r_{l,n_s}(m)$ meets the following formula:

$$r_{l,n_s}(m) = \frac{1}{\sqrt{2}}(1 - 2 \cdot c(2m + L)) + j\frac{1}{\sqrt{2}}(1 - 2 \cdot c(2m + 1 + L)),$$

$$m = 0, 1, \ldots, N_{RE} \cdot N_{RB} - 1$$

$$L = 2N_{RE} \cdot N_{RB} \cdot n_f.$$

$n_f$ is the frame number of the radio frame, $N_{RB}$ is a quantity of RBs (for example, $N_{RB}$ is a maximum quantity of resource blocks in a system or is a quantity of resource blocks actually occupied for transmitting the reference signal), $N_{RE}$ is a quantity of resource elements REs that are used to transmit the reference signal and that are on any symbol in one RB, and $n_s$ is an index of any slot in the radio frame, l is an index of any symbol in the slot; and $c(2m+L)$ and $c(2m+1+L)$ are at least a part of sequences in the Gold sequence generated based on an initialization seed, and $(2m+L)$ and $(2m+1+L)$ are indexes of the at least a part of sequences. For example, if the frame number of the radio frame is 2, $N_{RB}=110$, and $N_{RE}=2$, the sending device determines that the indexes $(2m+L=2m+2\times2\times110\times2=2m+880)$ and $(2m+1+L=2m+1+2\times2\times110\times2=2m+881)$ in the Gold sequence are indexes corresponding to the frame number of the radio frame, and selects a part of sequences $c(2m+880)$ and $c(2m+881)$ from the Gold sequence based on the indexes $2m+880$ and $2m+881$ to generate the reference signal sequence, where a value range of m is $0, 1, \ldots, 219$.

The following describes a method for generating the Gold sequence in Method 1.

The Gold sequence c(n) is generated as follows:

$$c(n)=(x_1(n+N_c)+x_2(n+N_c)) \bmod 2, \text{ where}$$

a length of Gold is denoted as $M_{PN}$, that is, a value range of n is 0, 1, ..., MPN–1, $x_1(n+N_c)$ and $X_2(n+N_c)$ are two m-sequences for generating c(n), and $N_c=1600$.

The foregoing first m-sequence $x_1(n+N_c)$ may be determined by using the following formula:

$$x_1(n+31)=(x_1(n+3)+x_1(n)) \bmod 2, \text{ where}$$

an initialization seed of the first m-sequence $x_1(n+N_c)$ is $x_1(0)=1$, $x_1(n)=0$, n=1, 2, ..., 30.

The foregoing second m-sequence $x_2(n+N_c)$ may be determined by using the following formula:

$$x_2(n+31)=(x_2(n+3)+x_2(n+2)+x_2(n+1)+x_2(n)) \bmod 2,$$
where optionally, an initialization seed of the second m-sequence $c_{init}=\Sigma_{i=0}^{30} x_2(i) \cdot 2^i$ is determined based on at least one of $n_s$, l, an index of any subframe in the radio frame, a cell identifier, a radio network temporary identifier RNTI, an identifier of a cyclic prefix CP, a reference signal identifier, a channel identifier, a subcarrier identifier, and a carrier identifier.

For example, the initialization seed of the second m-sequence is determined according to the following formula:

$$c_{init}=2^{28} \cdot \lfloor N_{ID}^{NPRS}/512 \rfloor + 2^{10} \cdot (N_{symb}^{DL} \cdot (n_s+1)+l+1) \cdot (2 \cdot (N_{ID}^{NPRS} \bmod 512)+1)+2 \cdot (N_{ID}^{NPRS} \bmod 512)+N_{CP}$$

$N_{ID}^{NPRS}$ is the cell identifier of the cell in which the sending device is located, and $N_{CP}$ is the identifier of the cyclic prefix CP. Generally, $N_{CP}=1$. For an extended CP, $N_{CP}=0$, and $N_{symb}^{DL}$ represents a quantity of symbols in any slot in the radio frame. Generally, $N_{symb}^{DL}=7$, and $N_{symb}^{DL}$ may also vary with the type of the CP. For example, when $N_{CP}=1$, $N_{symb}^{DL}=7$; and when $N_{CP}=0$, $N_{symb}^{DL}=6$.

It should be noted that the foregoing only uses an example in which the pseudo-random sequence is the Gold sequence for description. However, this embodiment of this application is not limited thereto. For example, the pseudo-random sequence may alternatively be an m-sequence or an M-sequence.

At least a part of reference signals are selected from the pseudo-random sequence based on the frame number of the radio frame, and the reference signal sequence is generated based on the at least a part of reference signals, so that the at least a part of reference signals selected from the pseudo-random sequence based on radio frames with different frame numbers are different. In this way, reference signal sequences in any two radio frames in each cell are different, so that when the receiving device performs in-phase combination on the received reference signal sequences in the plurality of radio frames, interference caused by the reference signal of the interfering cell to the reference signal of the target cell is reduced.

Method 2

By way of example and not limitation, the generating, by a sending device, a reference signal sequence based on a frame number of a radio frame includes: performing a modulo operation on the frame number of the radio frame based on a preset value K, where K is a positive integer; and generating the reference signal sequence based on a value resulting from the frame number of the radio frame mod K.

Specifically, when generating the reference signal sequence, the sending device introduces the value resulting from the frame number of the radio frame mod K, so that the generated reference signal sequence is associated with the value resulting from the frame number of the radio frame mod K.

In an implementation, the generating a reference signal sequence based on a frame number of a radio frame includes: generating a pseudo-random sequence; and generating the reference signal sequence based on at least a part of sequences in the pseudo-random sequence, where an index of the at least a part of sequences corresponds to the value resulting from the frame number of the radio frame mod K.

Specifically, in the NB-IoT system, for the NPRS, the pseudo-random sequence is a Gold sequence. The sending device first generates the Gold sequence, then selects at least a part of sequences from the Gold sequence based on the value resulting from the frame number of the radio frame mod K, and generates the reference signal sequence based on the at least a part of sequences.

For example, the reference signal sequence $r_{l,n_s}(m)$ meets the following formula:

$$r_{l,n_s}(m) = \frac{1}{\sqrt{2}}(1 - 2 \cdot c(2m+L)) + j\frac{1}{\sqrt{2}}(1 - 2 \cdot c(2m+1+L)),$$

$$m = 0, 1, \ldots, N_{RE} \cdot N_{RB} - 1$$

$$L = 2N_{RE} \cdot N_{RB} \cdot (n_f \bmod K),$$

where $n_f$ is the frame number of the radio frame, $N_{RB}$ is a quantity of RBs (for example, $N_{RB}$ is a maximum quantity of resource blocks in a system or is a quantity of resource blocks actually occupied for transmitting the reference signal), $N_{RE}$ is a quantity of resource elements REs that are used to transmit the reference signal and that are on any symbol in one RB, and $n_s$ is an index of any slot in the radio frame, l is an index of any symbol in the slot; and c(2m+L) and c(2m+1+L) are at least a part of sequences in the Gold sequence generated based on an initialization seed, (2m+L) and (2m+1+L) are indexes of the at least a part of sequences, and $n_f$ mod K is the value resulting from the frame number of the radio frame mod K.

For example, if the frame number of the radio frame is 2, $N_{RB}=110$, and $N_{RE}=2$, the sending device determines that the indexes (2m+L=2m+2×2×110×(70 mod 64)=2m+2640) and (2m+1+L=2m+1+2×2×110×(70 mod 64)=2m+2641) in the Gold sequence are indexes corresponding to the value resulting from the frame number of the radio frame mod K, where K=64, and selects a part of sequences c(2m+2640) and c(2m+2641) from the Gold sequence based on the indexes 2m+2640 and 2m+2641 to generate the reference signal sequence $r_{l,n_s}(m)$, where a value range of m is 0, 1, ..., 219.

The method for generating the Gold sequence in Method 2 is the same as the method for generating the Gold sequence described in Method 1. For details, refer to the method for generating the Gold sequence in Method 1. For brevity, details are not described herein again.

It should be noted that the foregoing only uses an example in which the pseudo-random sequence is the Gold sequence for description. However, this embodiment of this application is not limited thereto. For example, the pseudo-random sequence may alternatively be an m-sequence or an M-sequence.

The at least a part of reference signals are selected from the pseudo-random sequence based on the value resulting from the frame number of the radio frame mod the preset value K, and the reference signal sequence is generated based on the at least a part of reference signals, so that the at least a part of reference signals selected from the pseudo-random sequence based on different values resulting from performing a modulo operation by using K are different, and further, reference signal sequences in radio frames in which any two values resulting from performing a modulo operation by using the preset value K are different in each cell are different. Therefore, when the receiving device performs in-phase combination on the received reference signal sequences in the plurality of radio frames, interference caused by the reference signal of the interfering cell to the reference signal of the target cell is reduced.

Method 3

By way of example and not limitation, the generating, by a sending device, a reference signal sequence based on a frame number of a radio frame includes: generating a pseudo-random sequence based on the frame number of the radio frame; and generating the reference signal sequence based on the pseudo-random sequence.

Specifically, in the NB-IoT system, for the NPRS, the pseudo-random sequence is the Gold sequence. When generating the Gold sequence, the sending device introduces the frame number of the radio frame, so that the generated Gold sequence is associated with the frame number of the radio frame. Therefore, the reference signal sequence generated based on the Gold sequence is associated with the frame number of the radio frame.

Optionally, the generating the Gold sequence based on the frame number of the radio frame includes: determining an initialization seed of the Gold sequence based on a first parameter set, where the first parameter set includes the frame number of the radio frame; and generating the Gold sequence based on the initialization seed.

Specifically, for two m-sequences $x_1(n+N_c)$ and $x_2(n+N_c)$ for generating the Gold sequence c(n), an initialization seed of the first m-sequence $x_1(n+N_c)$ is determined based on the solution described in Method 1, and an initialization seed $c_{init}$ of the second m-sequence $x_2(n+N_c)$ is determined by using the following formula:

For example, $$c_{init}=2^{28} \cdot \lfloor N_{ID}^{NPRS}/512 \rfloor + (147 \cdot (n_f+1)+7 \cdot (n_s+1)+l+1) \cdot (2 \cdot (N_{ID}^{NPRS} \bmod 512)+1) + N_{CP}, \text{ or}$$

$$c_{init}=2^{28} \cdot \lfloor N_{ID}^{NPRS}/512 \rfloor + (140 \cdot (n_f+1)+7 \cdot (n_s+1)+l+1) \cdot (2 \cdot (N_{ID}^{NPRS} \bmod 512)+1) + N_{CP}.$$

After determining, according to the foregoing formula, the initialization seed for generating the Gold sequence, the sending device may generate the reference signal sequence $r_{l,n_s}(m)$ based on the at least a part of sequences in the Gold sequence.

For example, the reference signal sequence $r_{l,n_s}(m)$ generated by the sending device meets the following formula:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots , N_{RE} \cdot N_{RB} - 1,$$

$N_{RB}$ is a quantity of RBs (for example, $N_{RB}$ is a maximum quantity of resource blocks in a system, or is a quantity of resource blocks actually occupied for transmitting the reference signal), $N_{RE}$ is a quantity of resource elements REs that are used to transmit the reference signal and that are on any symbol in one RB, $n_s$ is an index of any slot in the radio frame, and l is an index of any symbol in the slot; and c(2m) and c(2m+1) are at least a part of sequences in the Gold sequence generated based on an initialization seed, and (2m) and (2m+1) are indexes of the at least a part of sequences.

For example, if $N_{RB}$=110, and $N_{RE}$=2, the sending device determines that the indexes (2m) and (2m+1) in the Gold sequence are indexes corresponding to the frame number of the radio frame, and selects a part of sequences c(2m) and c(2m+1) from the Gold sequence based on the indexes 2m and 2m+1 to generate the reference signal sequence $r_{l,n_s}(m)$, where a value range of m is 0, 1, . . . , 219.

The method for generating the Gold sequence in Method 3 is the same as the method for generating the Gold sequence described in Method 1. For details, refer to the method for generating the Gold sequence in Method 1. For brevity, details are not described herein again.

It should be noted that the foregoing only uses an example in which the pseudo-random sequence is the Gold sequence $$c_{init} = 2^\alpha \cdot \lfloor N_{ID}^{NPRS}/512 + A_{00} \rfloor +$$
$$2^\beta \cdot (B_{00} \cdot (n_f + B_{02}) + N_{symb}^{DL} \cdot (n_s + 1) + l + B_{03})^{\beta_1} \cdot (B_{10} \cdot 2^\gamma \cdot (N_{ID}^{NPRS} \bmod 512 + B_{11}) + B_{12})^{\beta_2} + C_{00} \cdot 2^\omega \cdot (N_{ID}^{NPRS} \bmod 512 + C_{01})^{\omega_1} + D_{00} + N_{CP}, \text{ or}$$

$$c_{init} = \begin{pmatrix} 2^\alpha \cdot \lfloor N_{ID}^{NPRS}/512 + A_{00} \rfloor + 2^\beta \cdot (B_{00} \cdot (n_f + B_{02}) + N_{symb}^{DL} \cdot (n_s + 1) + l + B_{03})^{\beta_1} \cdot (B_{10} \cdot 2^\gamma \cdot (N_{ID}^{NPRS} \bmod 512 + B_{11}) + B_{12})^{\beta_2} + \\ C_{00} \cdot 2^\omega \cdot (N_{ID}^{NPRS} \bmod 512 + C_{01})^{\omega_1} + D_{00} + N_{CP} \end{pmatrix} \bmod 2^{31}.$$

$n_f$ is the frame number of the radio frame, $n_s$ is an index of any slot in the radio frame, and l is an index of any symbol in the slot. $\alpha$, $\beta$, $\beta_1$, $\beta_2$, $\gamma$, $\omega$ and $\omega_i$ are all positive integers greater than or equal to 0. $A_{00}$, $B_{02}$, $B_{03}$, $B_{10}$, $B_{11}$, $C_{00}$, $C_{01}$, and $D_{00}$ are all positive integers greater than or equal to 0, and $B_{00}$ is a positive integer greater than 0. $N_{ID}^{NPRS}$ is the cell identifier of the cell in which the sending device is located, and $N_{CP}$ is the identifier of the cyclic prefix CP. Generally, $N_{CP}$=1. For an extended CP, $N_{CP}$=0, and $N_{symb}^{DL}$ represents a quantity of symbols in any slot in the radio frame. Generally, $N_{symb}^{DL}$=7, and $N_{symb}^{DL}$ may also vary with the type of the CP. For example, when $N_{CP}$=1, $N_{symb}^{DL}$=7; and when $N_{CP}$=0, $N_{symb}^{DL}$=6.

for description. However, this embodiment of this application is not limited thereto. For example, the pseudo-random sequence may alternatively be an m-sequence or an M-sequence.

The initialization seed of the pseudo-random sequence is generated based on the frame number of the radio frame. Then, the pseudo-random sequence is generated based on the initialization seed, to make randomized sequences generated based on frame numbers of different radio frames different, and finally, to make reference signal sequences generated based on the frame numbers of different radio frames different. Therefore, when the receiving device performs in-phase combination on the received reference signal sequences in the plurality of radio frames, interference caused by the reference signal of the interfering cell to the reference signal of the target cell is reduced.

Method 4

By way of example and not limitation, the sending device determines the initialization seed of the pseudo-random sequence based on a first parameter set, where the first parameter set includes a value resulting from the frame number of the radio frame mod K, and K is a positive integer, and generates the pseudo-random sequence based on the initialization seed.

Specifically, in the NB-IoT system, for the NPRS, the pseudo-random sequence is a Gold sequence. For two m-sequences $x_1(n+N_c)$ and $x_2(n+N_c)$ for generating the Gold sequence $c(n)$, an initialization seed of the first m-sequence $x_1(n+N_c)$ is determined based on the solution described in Method 1, and an initialization seed $c_{init}$ of the second m-sequence $x_2(n+N_c)$ is determined by using the following formula:

$$c_{init} = 2^\alpha \cdot \lfloor N_{ID}^{NPRS}/512 + A_{00} \rfloor + 2^\beta \cdot (B_{00} \cdot (n_f \bmod B_{01} + B_{02}) + N_{symb}^{DL} \cdot (n_s+1) + l + B_{03})^{\beta_1} \cdot (B_{10} \cdot 2^\gamma \cdot (N_{ID}^{NPRS} \bmod 512 + B_{11}) + B_{12})^{\beta_2} +$$
$$C_{00} \cdot 2^\omega \cdot (N_{ID}^{NPRS} \bmod 512 + C_{01})^{\omega_1} + D_{00} + N_{CP}, \text{ or}$$

$$c_{init} = \begin{pmatrix} 2^\alpha \cdot \lfloor N_{ID}^{NPRS}/512 + A_{00} \rfloor + 2^\beta \cdot (B_{00} \cdot (n_f \bmod B_{01} + B_{02}) + N_{symb}^{DL} \cdot (n_s+1) + l + B_{03})^{\beta_1} \cdot (B_{10} \cdot 2^\gamma \cdot (N_{ID}^{NPRS} \bmod 512 + B_{11}) + B_{12})^{\beta_2} + \\ C_{00} \cdot 2^\omega \cdot (N_{ID}^{NPRS} \bmod 512 + C_{01})^{\omega_1} + D_{00} + N_{CP} \end{pmatrix}$$

$$\bmod 2^{31}.$$

$n_f$ is the frame number of the radio frame, $n_s$ is an index of any slot in the radio frame, and l is an index of any symbol in the slot. $\alpha, \beta, \beta_1, \beta_2, \gamma, \omega$ and $\omega_1$ are all positive integers greater than or equal to 0. $A_{00}, B_{02}, B_{03}, B_{10}, B_{11}, C_{00}, C_{01}$, and $D_{00}$ are all positive integers greater than or equal to 0, and $B_{00}$ is a positive integer greater than 0. $N_{ID}^{NPRS}$ is the cell identifier of the cell in which the sending device is located, and $N_{CP}$ is the identifier of the cyclic prefix CP. Generally, $N_{CP}=1$. For an extended CP, $N_{CP}=0$, and $N_{symb}^{DL}$ represents a quantity of symbols in any slot in the radio frame. Generally, $N_{symb}^{DL}=7$, and $N_{symb}^{DL}$ may also vary with the type of the CP. For example, when $N_{CP}=1$, $N_{symb}^{DL}=7$; and when $N_{CP}=0$, $N_{symb}^{DL}=6$.

For example, $c_{init}=2^{24} \cdot \lfloor N_{ID}^{NPRS}/512 \rfloor+(147 \cdot (n_f+64+1)+7 \cdot (n_s+1)+l+1) \cdot (2 \cdot (N_{ID}^{NPRS} \bmod 512)+1)+N_{CP}$, or $c_{init}=2^{24} \cdot \lfloor N_{ID}^{NPRS}/512 \rfloor+(140 \cdot (n_f+64+1)+7 \cdot (n_s+1)+l+1) \cdot (2 \cdot (N_{ID}^{NPRS} \bmod 512)+1)+N_{CP}$, or $c_{init}=2^{25} \cdot \lfloor N_{ID}^{NPRS}/512 \rfloor+(147 \cdot (n_f+128+1)+7 \cdot (n_s+1)+l+1) \cdot (2 \cdot (N_{ID}^{NPRS} \bmod 512)+1)+N_{CP}$, or $c_{init}=2^{25} \cdot \lfloor N_{ID}^{NPRS}/512 \rfloor+(140 \cdot (n_f+128+1)+7 \cdot (n_s+1)+l+1) \cdot (2 \cdot (N_{ID}^{NPRS} \bmod 512)+1)+N_{CP}$.

After determining, according to the foregoing formula, the initialization seed for generating the Gold sequence, the sending device may generate the reference signal sequence $r_{l,n_s}(m)$ based on the at least a part of sequences in the Gold sequence.

For example, the reference signal sequence $r_{l,n_s}(m)$ generated by the sending device meets the following formula:

$$r_{l,n_s}(m) = \frac{1}{\sqrt{2}}(1-2 \cdot c(2m)) + j\frac{1}{\sqrt{2}}(1-2 \cdot c(2m+1)),$$

$$m = 0, 1, \ldots, N_{RE} \cdot N_{RB} - 1,$$

where $N_{RB}$ is a quantity of RBs (for example, $N_{RB}$ is a maximum quantity of resource blocks in a system, or is a quantity of resource blocks actually occupied for transmitting the reference signal), $N_{RE}$ is a quantity of resource elements REs that are used to transmit the reference signal and that are on any symbol in one RB, $n_s$ is an index of any slot in the radio frame, and l is an index of any symbol in the slot; and c(2m) and c(2m+1) are at least a part of sequences in the Gold sequence generated based on an initialization seed, and (2m) and (2m+1) are indexes of the at least a part of sequences.

For example, if $N_{RB}=110$, and $N_{RE}=2$, the indexes (2m) and (2m+1) are the at least a part of sequences in the Gold sequence generated based on the initialization seed, and a part of sequences c(2m) and c(2m+1) are selected from the Gold sequence based on the index 2m and 2m+1 to generate the reference signal sequence, where a value range of m is 0, 1, . . . , 219.

The method for generating the Gold sequence in Method 4 is the same as the method for generating the Gold sequence described in Method 1. For details, refer to the method for generating the Gold sequence in Method 1. For brevity, details are not described herein again.

It should be noted that the foregoing only uses an example in which the pseudo-random sequence is the Gold sequence for description. However, this embodiment of this application is not limited thereto. For example, the pseudo-random sequence may alternatively be an m-sequence or an M-sequence.

The initialization seed of the pseudo-random sequence is generated based on the value resulting from the frame number of the radio frame mod K. Then, the pseudo-random sequence is generated based on the initialization seed, to make randomized sequences generated based on different values resulting from the frame number of different radio frame mod K different, and finally, to make the reference signal sequences generated based on the different values resulting from performing a modulo operation by using K different. Therefore, when the receiving device performs in-phase combination on the received reference signal sequences in the plurality of radio frames, interference caused by the reference signal of the interfering cell to the reference signal of the target cell is reduced.

Method 5

By way of example and not limitation, the generating, by a sending device, a reference signal sequence based on a frame number of a radio frame includes: generating a pseudo-random sequence based on the frame number of the radio frame; and generating the reference signal sequence based on the pseudo-random sequence.

Specifically, in the NB-IoT system, for the NPRS, the pseudo-random sequence is the Gold sequence. When generating the Gold sequence, the sending device introduces the frame number of the radio frame, so that the generated Gold sequence is associated with the frame number of the radio frame. Therefore, the reference signal sequence generated based on the Gold sequence is associated with the frame number of the radio frame.

Optionally, the generating a Gold sequence based on the frame number of the radio frame includes: determining an initialization seed of the Gold sequence based on a first parameter set, where the first parameter set includes the frame number of the radio frame; and generating the Gold sequence based on the initialization seed.

Specifically, for two sequences $x_1(n+N_c)$ and $x_2(n+N_c)$ for generating the Gold sequence c(n), an initialization seed of the first sequence $x_1(n+N_c)$ is determined based on the solution described in Method 1, and an initialization seed $c_{init}$ of the second sequence $x_2(n+N)$ is determined by using the following formula:

$$c_{init} = 2^\alpha \cdot \lfloor N_{ID}^{NPRS}/512 + A_{00} \rfloor + 2^\beta \cdot (B_{00} \cdot (n_f \bmod B_{01} + B_{02}) + N_{symb}^{DL} \cdot (n_s + 1) + l + B_{03})^{\beta_1} \cdot (B_{10} \cdot 2^\gamma \cdot (N_{ID}^{NPRS} \bmod 512 + B_{11}) + B_{12})^{\beta_2} +$$

$$C_{00} \cdot 2^\omega \cdot (N_{ID}^{NPRS} \bmod 512 + C_{01})^{\omega_1} + D_{00} + N_{CP}, \text{ or}$$

$$c_{init} = \begin{pmatrix} 2^\alpha \cdot \lfloor N_{ID}^{NPRS}/512 + A_{00} \rfloor + 2^\beta \cdot (B_{00} \cdot (n_f \bmod B_{01} + B_{02}) + N_{symb}^{DL} \cdot (n_s + 1) + l + B_{03})^{\beta_1} \cdot (B_{10} \cdot 2^\gamma \cdot (N_{ID}^{NPRS} \bmod 512 + B_{11}) + B_{12})^{\beta_2} + \\ C_{00} \cdot 2^\omega \cdot (N_{ID}^{NPRS} \bmod 512 + C_{01})^{\omega_1} + D_{00} + N_{CP} \end{pmatrix}$$

$$\bmod 2^{31}.$$

$n_f$ is the frame number of the radio frame. $\alpha, \beta, \beta_1, \beta_2, \gamma, \omega$ and $\omega_1$ are all positive integers greater than or equal to 0. $A_{00}, B_{02}, B_{03}, B_{10}, B_{11}, C_{00}, C_{01}$, and $D_{00}$ are all positive integers greater than or equal to 0, and $B_{00}$ is a positive integer greater than 0. $N_{ID}^{NPRS}$ is the cell identifier of the cell in which the sending device is located, and $N_{CP}$ is the identifier of the cyclic prefix CP. Generally, $N_{CP}=1$. For an extended CP, $N_{CP}=0$.

For example, $c_{init}=2^{28} \cdot \lfloor N_{ID}^{NPRS}/512 \rfloor + 2^9(n_f+1) \cdot (N_{ID}^{NPRS} \bmod 512 + 1) + N_{ID}^{NPRS} \bmod 512 + N_{CP}$, or $c_{init}=2^{28} \cdot \lfloor N_{ID}^{NPRS}/512 \rfloor + (n_f+1) \cdot (N_{ID}^{NPRS} \bmod 512+1)^2 + N_{CP}$, or $c_{init}=2^{20} \cdot \lfloor N_{ID}^{NPRS}/512 \rfloor + (n_f+1) \cdot (N_{ID}^{NPRS} \bmod 512) + 1) + N_{CP}$.

After determining, according to the foregoing formula, the initialization seed for generating the Gold sequence, the sending device may generate the reference signal sequence $r_{l,n_s}(m)$ based on the at least a part of sequences in the Gold sequence.

For example, the reference signal sequence $r_{l,n_s}(m)$ generated by the sending device meets the following formula:

$$r_{l,n_s}(m) = \frac{1}{\sqrt{2}}(1 - 2 \cdot c(2m+L)) + j\frac{1}{\sqrt{2}}(1 - 2 \cdot c(2m+1+L)),$$

$$m = 0, 1, \ldots, N_{RE} \cdot N_{RB} - 1$$

$$L = 2N_{RE} \cdot N_{RB} \cdot (N_{symb} \cdot n_s + l).$$

$N_{RB}$ is a quantity of RBs (for example, $N_{RB}$ is a maximum quantity of resource blocks in a system or is a quantity of resource blocks actually occupied for transmitting the reference signal), $N_{RE}$ is a quantity of resource elements REs that are used to transmit the reference signal and that are on any symbol in one RB, and $N_{symb}^{DL}$ represents a quantity of symbols in any slot in the radio frame. Generally, $N_{symb}^{DL}=7$, and $N_{symb}^{DL}$ may also vary with a CP type. For example, when $N_{CP}=1$, $N_{symb}^{DL}=7$; and when $N_{CP}=0$, $N_{symb}^{DL}=6$. $n_s$ is an index of any slot in the radio frame, l is an index of any symbol in the slot, c(2m+L) and c(2m+1+L) are at least a part of sequences in the Gold sequence generated based on an initialization seed, and (2m+L) and (2m+1+L) are indexes of the at least a part of sequences.

For example, if the frame number of the radio frame is 8, a slot index $n_s$ in the radio frame is equal to 1, a symbol index l in the slot is equal to 1, and a quantity of symbols $N_{symb}$ in any slot in the radio frame is equal to 7, $N_{RB}=110$, and $N_{RE}=2$, the sending device determines that the indexes $(2m+L=2m+2 \times 2 \times 110 \times (7 \times 1+1)=2m+3520)$ and $(2m+1+L=2m+1+2 \times 2 \times 110 \times (7 \times 1+1)=2m+3521)$ in the Gold sequence are indexes corresponding to the frame number of the radio frame, and selects a part of sequences c(2m+3520) and c(2m+3521) from the Gold sequence based on the indexes 2m+3520 and 2m+3521 to generate the reference signal sequence, where a value range of m is 0, 1, . . . , 219.

The method for generating the Gold sequence in Method 5 is the same as the method for generating the Gold sequence described in Method 1. For details, refer to the method for generating the Gold sequence in Method 1. For brevity, details are not described herein again.

It should be noted that the foregoing only uses an example in which the pseudo-random sequence is the Gold sequence for description. However, this embodiment of this application is not limited thereto. For example, the pseudo-random sequence may alternatively be an m-sequence or an M-sequence.

The initialization seed of the pseudo-random sequence is generated based on the frame number of the radio frame. Then, the pseudo-random sequence is generated based on the initialization seed, to make randomized sequences generated based on frame numbers of different radio frames different, and finally, to make reference signal sequences generated based on the frame numbers of different radio frames different. Therefore, when the receiving device performs in-phase combination on the received reference signal sequences in the plurality of radio frames, interference caused by the reference signal of the interfering cell to the reference signal of the target cell is reduced.

Method 6

By way of example and not limitation, the generating, by a sending device, a reference signal sequence based on a frame number of a radio frame includes: generating a pseudo-random sequence based on the frame number of the radio frame; and generating the reference signal sequence based on the pseudo-random sequence.

Specifically, in the NB-IoT system, for the NPRS, the pseudo-random sequence is the Gold sequence. When generating the Gold sequence, the sending device introduces the frame number of the radio frame, so that the generated Gold sequence is associated with the frame number of the radio frame. Therefore, the reference signal sequence generated based on the Gold sequence is associated with the frame number of the radio frame.

Optionally, the generating a Gold sequence based on the frame number of the radio frame includes: determining an initialization seed of the Gold sequence based on a first parameter set, where the first parameter set includes a resulting from the frame number of the radio frame mod K, and K is a positive integer; and generating the Gold sequence based on the initialization seed.

Specifically, for two m-sequences $x_1(n+N_c)$ and $x_2(n+N_c)$ for generating the Gold sequence c(n), an initialization seed of the first m-sequence $x_1(n+N_c)$ is determined based on the solution described in Method 1, and an initialization seed $c_{init}$ of the second m-sequence $x_2(n+N_c)$ is determined by using the following formula:

$N_{RB}$ is a quantity of RBs (for example, $N_{RB}$ is a maximum quantity of resource blocks in a system, or is a quantity of resource blocks actually occupied for transmitting the reference signal), $N_{RE}$ is a quantity of resource elements REs that are used to transmit the reference signal and that are on any symbol in one RB, and $N_{symb}^{DL}$ represents a quantity of symbols in any slot in the radio frame. Generally, $N_{symb}^{DL}=7$, and $N_{symb}^{DL}$ may also vary with the type of the CP. For example, when $N_{CP}=1$, $N_{symb}^{DL}=7$; and when $N_{CP}=0$, $N_{symb}^{DL}=6$. $n_s$ is an index of any slot in the radio frame, l is an index of any symbol in the slot, c(2m+L) and c(2m+1+L) are at least a part of sequences in the Gold sequence generated based on an initialization seed, and (2m+L) and (2m+1+L) are indexes of the at least a part of sequences.

For example, if the frame number of the radio frame is 9, a slot index $n_s$ in the radio frame is equal to 1, a symbol index l in the slot is equal to 1, and a quantity of symbols $N_{symb}$ in any slot in the radio frame is equal to 7, $N_{RB}=110$, $$c_{init} = 2^{\alpha} \cdot \lfloor N_{ID}^{NPRS}/512 + A_{00} \rfloor + 2^{\beta} \cdot (B_{00} \cdot (n_f \bmod B_{01} + B_{02}) + N_{symb}^{DL} \cdot (n_s + 1) + l + B_{03})^{\beta_1} \cdot (B_{10} \cdot 2^{\gamma} \cdot (N_{ID}^{NPRS} \bmod 512 + B_{11}) + B_{12})^{\beta_2} +$$
$$C_{00} \cdot 2^{\omega} \cdot (N_{ID}^{NPRS} \bmod 512 + C_{01})^{\omega_1} + D_{00} + N_{CP}, \text{ or}$$

$$c_{init} = \begin{pmatrix} 2^{\alpha} \cdot \lfloor N_{ID}^{NPRS}/512 + A_{00} \rfloor + 2^{\beta} \cdot (B_{00} \cdot (n_f \bmod B_{01} + B_{02}) + N_{symb}^{DL} \cdot (n_s + 1) + l + B_{03})^{\beta_1} \cdot (B_{10} \cdot 2^{\gamma} \cdot (N_{ID}^{NPRS} \bmod 512 + B_{11}) + B_{12})^{\beta_2} + \\ C_{00} \cdot 2^{\omega} \cdot (N_{ID}^{NPRS} \bmod 512 + C_{01})^{\omega_1} + D_{00} + N_{CP} \end{pmatrix}$$

$$\bmod 2^{31}.$$

$n_f$ is the frame number of the radio frame. $\alpha$, $\beta$, $\beta_1$, $\beta_2$, $\gamma$, $\omega$ and $\omega_1$ are all positive integers greater than or equal to 0. $A_{00}$, $B_{02}$, $B_{03}$, $B_{10}$, $B_{11}$, $C_{00}$, $C_{01}$, and $D_{00}$ are all positive integers greater than or equal to 0, and $B_{00}$ is a positive integer greater than 0. $N_{ID}^{NPRS}$ is the cell identifier of the cell in which the sending device is located, and $N_{CP}$ is the identifier of the cyclic prefix CP. Generally, $N_{CP}=1$. For an extended CP, $N_{CP}=0$.

For example, $c_{init}=2^{26} \cdot \lfloor N_{ID}^{NPRS}/512 \rfloor + 2^{10}(n_f \bmod 64+1) \cdot (2 \cdot (N_{ID}^{NPRS} \bmod 512)+1)+2 \cdot (N_{ID}^{NPRS} \bmod 512)+ N_{CP}$, or $c_{init}=2^{26} \cdot \lfloor N_{ID}^{NPRS}/512 \rfloor + (n_f \bmod 64+1) \cdot (2 \cdot (N_{ID}^{NPRS} \bmod 512)+1)^2 + N_{CP}$, or $c_{init}=2^{27} \cdot \lfloor N_{ID}^{NPRS}/512 \rfloor + 2^{10}(n_f \bmod 128+1) \cdot (2 \cdot (N_{ID}^{NPRS} \bmod 512)+1)+2 \cdot (N_{ID}^{NPRS} \bmod 512)+ N_{CP}$, or $c_{init}=2^{27} \cdot \lfloor N_{ID}^{NPRS}/512 \rfloor + (n_f \bmod 128+1) \cdot (2 \cdot (N_{ID}^{NPRS} \bmod 512)+1)^2 + N_{CP}$.

After determining, according to the foregoing formula, the initialization seed for generating the Gold sequence, the sending device may generate the reference signal sequence $r_{l,n_s}(m)$ based on the at least a part of sequences in the Gold sequence.

For example, the reference signal sequence $r_{l,n_s}(m)$ generated by the sending device meets the following formula:

$$r_{l,n_s}(m) = \frac{1}{\sqrt{2}}(1 - 2 \cdot c(2m+L)) + j\frac{1}{\sqrt{2}}(1 - 2 \cdot c(2m+1+L)),$$

$$m = 0, 1, \ldots, N_{RE} \cdot N_{RB} - 1$$

$$L = 2N_{RE} \cdot N_{RB} \cdot (N_{symb} \cdot n_s + l).$$

$N_{RE}=2$, and K=64, the sending device determines that the indexes $(2m+L=2m+2\times2\times110\times(7\times1+1)=2m+3520)$ and $(2m+1+L=2m+1+2\times2\times110\times(7\times1+1)=2m+3521)$ in the Gold sequence are indexes corresponding to the value resulting from the frame number of the radio frame mod K, where K=64, and selects a part of sequences c(2m+3520) and c(2m+3521) from the Gold sequence based on the indexes 2m+3520 and 2m+3521 to generate the reference signal sequence $r_{l,n_s}(m)$, where a value range of m is 0, 1, ..., 219.

The method for generating the Gold sequence in Method 6 is the same as the method for generating the Gold sequence described in Method 1. For details, refer to the method for generating the Gold sequence in Method 1. For brevity, details are not described herein again.

It should be noted that the foregoing only uses an example in which the pseudo-random sequence is the Gold sequence for description. However, this embodiment of this application is not limited thereto. For example, the pseudo-random sequence may alternatively be an m-sequence or an M-sequence.

The initialization seed of the pseudo-random sequence is generated based on the value resulting from the frame number of the radio frame mod K. Then, the pseudo-random sequence is generated based on the initialization seed, to make randomized sequences generated based on values resulting from the frame number of the radio frame mod K by the frame numbers of different radio frames different, and finally, to make the reference signal sequences generated based on the different values resulting from the frame number of the radio frame mod K different. Therefore, when the receiving device performs in-phase combination on the received reference signal sequences in the plurality of radio frames, interference caused by the reference signal of the interfering cell to the reference signal of the target cell is reduced.

It should be noted that in the foregoing Method 3 to Method 6, the first parameter set may further include at least one of an index of any subframe in the radio frame, a cell identifier, a radio network temporary identifier RNTI, an identifier of a cyclic prefix CP, a reference signal identifier, a channel identifier, a subcarrier identifier, and a carrier identifier.

To be specific, the sending device may further determine the initialization seed of the Gold sequence based on the frame number of the radio frame and at least one of the index of any subframe in the radio frame, the cell identifier, the radio network temporary identifier RNTI, the identifier of the cyclic prefix CP, the reference signal identifier, the channel identifier, the subcarrier identifier, and the carrier identifier. The first parameter set may further include a parameter configured by a network device. For example, when the DMRS and the PTRS that are for different channels are generated in the NR system based on the Gold sequence, the method for generating the Gold sequence is the same as the method for generating the Gold sequence described in Method 1, and an initialization formula of the second m-sequence in the Gold sequence is:

$$c_{init}=(2^{17}(14n_s+l+1)(2N_{ID}^{nSCID}+1)+2N_{ID}^{nSCID}+n_{SCID}) \mod 2^{31}, \text{where}$$

$n_{SCID}$ is the parameter configured by the network device.

For another example, when different channel CSI-RSs are generated in the NR system based on the Gold sequence, the method for generating the Gold sequence is the same as the method for generating the Gold sequence described in Method 1, and an initialization formula of the second m-sequence in the Gold sequence is:

$$c_{init}=(2^{10}\cdot(14n_s+l+1)(2n_{ID}+1)+n_{ID}) \mod 2^{31}, \text{where}$$

$n_{ID}$ is the parameter configured by the network device.

It should be further noted that the foregoing merely describes the method for generating the reference signal sequence in this embodiment of this application by using an NPRS sequence as the reference signal sequence. However, this embodiment of this application is not limited thereto. For example, the method for generating the reference signal sequence in this embodiment of this application may be further applicable to a positioning reference signal (PRS), a cell-specific reference signal (CRS), and a channel state information-reference signal (CSI-RS) in an LTE system, a narrowband reference signal (NRS) in an NB-IoT system, and a demodulation reference signal (DMRS) for different physical channels, a CSI-RS, and a phase-tracking reference signal (PTRS) in a new radio (NR) system. The following briefly describes the foregoing method for generating the reference signal sequence.

For a PRS sequence in LTE, because a formula for generating an initialization seed of the PRS sequence and a formula for generating the reference signal sequence of the PRS sequence are the same as an initialization formula and a sequence generation formula in an NPRS sequence in NB-IoT, and the formula for generating the initialization seed is slightly different from the formula for generating the initialization seed in Method 1 to Method 6, in the formula for generating the initialization seed in Method 1 to Method 6, only $N_{ID}^{NPRS}$ needs to be replaced with $N_{ID}^{PRS}$. Therefore, for a method for generating the PRS sequence, refer to related descriptions in the foregoing Method 1 to Method 6. For brevity, details are not described herein again.

For a CRS in LTE, because a formula for generating a reference signal sequence of the CRS is the same as the formula for generating the reference sequence in the foregoing Method 1 to Method 6, and a formula for generating an initialization seed is slightly different from the formula for generating the initialization seed in Method 1 to Method 6, in the formula for generating the initialization seed in Method 1 to Method 6, only $N_{ID}^{NPRS}$ needs to be replaced with $N_{ID}^{cell}$, and $n_s$ needs to be replaced with $n_s'$.

When the CRS is a part of a dedicated reference signal (dedicated reference signal, DRS), $n_s'=10 \in n_s/10 \rfloor + n_s \mod 2$. Otherwise, $n_s'=n_s$, and $n_s$ is an index of any slot in the radio frame.

For an LTE CSI-RS sequence, because a formula for generating a reference signal sequence of the LTE CSI-RS sequence is the same as the formula for generating the reference sequence in the foregoing Method 1 to Method 6, and a formula for generating an initialization seed is slightly different from the formula for generating the initialization seed in Method 1 to Method 6, in the formula for generating the initialization seed in Method 1 to Method 6, only $N_{ID}^{NPRS}$ needs to be replaced with $N_{ID}^{CSI}$, and $n_s$ needs to be replaced with $n_s'$.

When the CRS is apart of the DRS, $n_s'=10 \lfloor n_s/10 \rfloor + n_s \mod 2$. Otherwise, $n_s'=n_s$, and $n_s$ is an index of any slot in the radio frame.

$N_{ID}^{NPRS}$, $N_{ID}^{PRS}$, $N_{ID}^{CSI}$, and $N_{ID}^{nSCID}$ are identifiers related to the reference signal, and correspond to the foregoing reference signal identifier.

For another reference signal, details are not described herein again. The method for generating the reference signal sequence in Method 1 to Method 6 is also applicable to generation of another reference signal sequence.

In this embodiment of this application, the method 200 further includes the following steps.

204: The receiving device generates the reference signal sequence.

Specifically, the receiving device locally generates the reference signal sequence. The method for generating the reference signal sequence by the receiving device is the same as that described in the foregoing Method 1 to Method 6. For details, refer to the method for generating the reference signal sequence in the foregoing Method 1 to Method 6. For brevity, details are not described herein again.

205: The receiving device determines the resource position, where the resource position is a resource position that corresponds to the radio frame and that is used to transmit the at least a part of reference signals.

Specifically, before receiving the at least a part of reference signals sent by the sending device, the receiving device first determines the resource position carrying the at least a part of reference signals, to receive, at the resource position, the at least a part of reference signals sent by the sending device.

206: The receiving device receives, at the resource position, the at least a part of reference signals sent by the sending device, or receives, at the resource position, the orthogonal reference signal, where the orthogonal reference signal is obtained by multiplying the at least a part of reference signals by the preset orthogonal code.

Specifically, the receiving device receives, at the determined resource position, the at least a part of reference signals sent by the sending device, or the receiving device receives the orthogonal reference signal sent by the sending device, and the orthogonal reference signal is obtained by multiplying the at least a part of reference signals by the preset orthogonal code.

After receiving the at least a part of reference signals sent by the sending device, the receiving device selects at least a part of reference signals whose indexes are the same as indexes of at least a part of reference signals from a locally generated first reference signal sequence, and correspondingly processes the at least a part of reference signals that are locally generated and the at least a part of reference signals that are received. A specific processing manner is related to a function of the reference signal.

For example, when the function of the reference signal is channel estimation, the receiving device obtains channel information based on the at least a part of reference signals that are locally generated and the at least a part of reference signals that are received.

When the function of the reference signal is frequency offset tracking, the receiving device obtains frequency offset information based on the at least a part of reference signals that are locally generated and the at least a part of reference signals that are received, and the frequency offset information may be used for data demodulation.

When the function of the reference signal is positioning, the receiving device obtains timing information based on the at least a part of reference signals that are locally generated and the at least a part of reference signals that are received, and the timing information may be used to assist in positioning.

Figure 5:
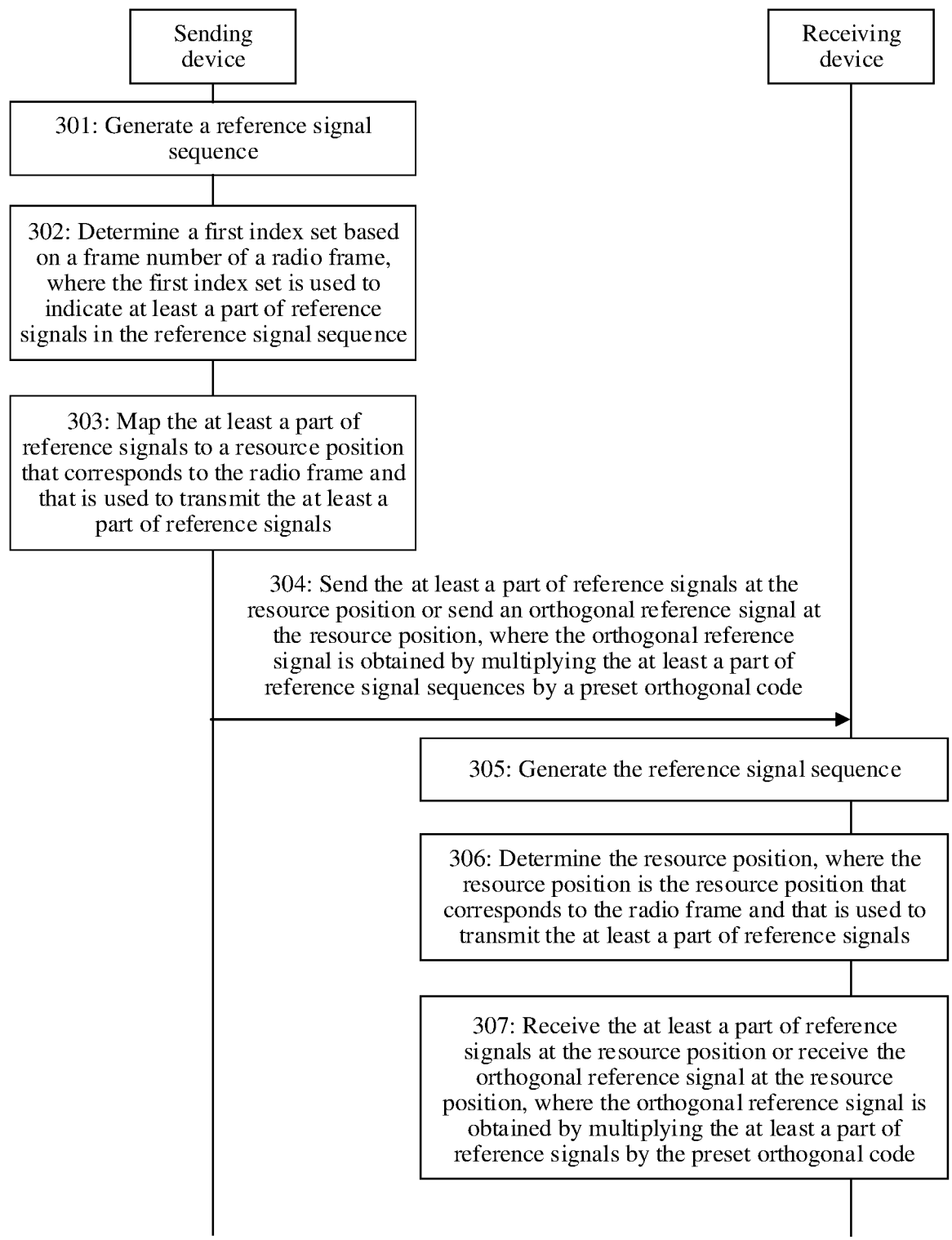
FIG. 5 is another schematic flowchart of a reference signal transmission method according to an embodiment of this application.

An embodiment of this application further provides a reference signal sequence transmission method 300. FIG. 5 is a schematic flowchart of the reference signal transmission method 300 according to this embodiment of this application.

In downlink transmission, a sending device in FIG. 5 may be the network device 101 in FIG. 2, and a receiving device may be any one of the terminal device 101 to the terminal device 106 in FIG. 2. In uplink transmission, a sending device in FIG. 5 may be any one of the terminal device 101 to the terminal device 106 in FIG. 2, and a receiving device may be the network device in FIG. 2. Certainly, a quantity of network devices and a quantity of terminal devices in an actual system may not be limited to an example in this embodiment or another embodiment. Details are not described below again. The method 300 includes at least the following steps.

301: Generate a reference signal sequence.

A method for generating a narrowband positioning reference signal (NPRS) sequence in a narrowband internet of things (NB-IoT) is used as an example below, and an example in which a resource block is an RB is used to describe the method for generating the reference signal sequence in this embodiment of this application.

Specifically, the sending device first generates a pseudo-random sequence, then selects at least a part of sequences from the pseudo-random sequence, and generates the reference signal sequence based on the at least a part of sequences.

The foregoing pseudo-random sequence may be an m-sequence, an M-sequence, a Gold sequence, or the like. For example, in an NB-IoT system, for the NPRS, the pseudo-random sequence is the Gold sequence, and the reference signal sequence $r_{l,n_s}(m)$ meets the following formula:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RE} \cdot N_{RB} - 1,$$

where $N_{RB}$ is a quantity of RBs (for example, $N_{RB}$ is a maximum quantity of resource blocks in a system or is a quantity of resource blocks actually occupied for transmitting the reference signal), $N_{RE}$ is a quantity of resource elements REs that are used to transmit the reference signal and that are on any symbol in one RB, $n_s$ is an index of any slot in the radio frame, l is an index of any symbol in the slot, c(2m) and c(2m+1) are at least a part of sequences in the pseudo-random sequence generated based on an initialization seed, and (2m) and (2m+1) are indexes of the at least a part of sequences.

The following describes a method for generating the Gold sequence.

The Gold sequence c(n) is generated as follows:

$$c(n)=(x_1(n+N_c)+x_2(n+N_c)) \bmod 2, \text{ where}$$

a length of Gold is denoted as $M_{PN}$, that is, a value range of n is 0, 1, ..., MPN−1, $x_1(n+N_c)$ and $x_2(n+N_c)$ are two m-sequences for generating c(n) and $N_c$=1600.

The foregoing first m-sequence $x_1(n+N_c)$ may be determined by using the following formula:

$$x_1(n+31)=(x_1(n+3)+x_1(n)) \bmod 2,$$

where an initialization seed of the sequence $x_1(n+N_c)$ is $x_1(0)=1$, $x_1(n)=0$, n=1, 2, ..., 30.

The foregoing second m-sequence $x_2(n+N_c)$ may be determined by using the following formula:

$$x_2(n+31)=(x_2(n+3)+x_2(n+2)+x_2(n+1)+x_2(n)) \bmod 2,$$

where optionally, an initialization seed of the second m-sequence $x_2(n+N_c)$ is determined based on at least one of $n_s$, l, an index of any subframe in the radio frame, a cell identifier, a radio network temporary identifier RNTI, an identifier of a cyclic prefix CP, a reference signal identifier, a channel identifier, a subcarrier identifier, and a carrier identifier.

For example, the initialization seed of the second m-sequence is determined according to the following formula:

$$c_{init}=2^{28} \cdot \lfloor N_{ID}^{NPRS}/512 \rfloor + 2^{10} \cdot (N_{symb}^{DL} \cdot (n_s+1)+l+1) \cdot (2 \cdot (N_{ID}^{NPRS} \bmod 512)+1)+2 \cdot (N_{ID}^{NPRS} \bmod 512)+N_{CP}$$

$N_{ID}^{NPRS}$ is the cell identifier of the cell in which the sending device is located, and $N_{CP}$ is the identifier of the cyclic prefix CP. Generally, $N_{CP}$=1. For an extended CP, $N_{CP}$=0, and $N_{symb}^{DL}$ represents a quantity of symbols in any slot in the radio frame. Generally, $N_{symb}^{DL}$=7, and $N_{symb}^{DL}$ may also vary with the type of the CP. For example, when $N_{CP}$=1, $N_{symb}^{DL}$=7; and when $N_{CP}$=0, $N_{symb}^{DL}$=6.

302: Determine a first index set based on a frame number of a radio frame, where the first index set is used to indicate at least a part of reference signals in the reference signal sequence.

Specifically, after generating the reference signal sequence, the sending device determines, in the reference signal sequence based on the frame number of the radio frame, an index (for example, the first index set) of the at least a part of reference signals to be sent to the receiving device.

For example, the index m' that is of the reference signal and that is determined by the sending device based on the frame number of the radio frame meets the following formula:

$$m'=f(n_f).$$

$n_f$ represents the frame number of the radio frame, and $f(n_f)$ represents a function or a mapping of the frame number $n_f$ of the radio frame. The following uses an NPRS of an NB-IoT system as an example. When the NB-IoT is deployed in a guard band or independently deployed:

$$m_0=0,1$$

$$m'=m_0+N_{RB}^{max,DL}+(k_0(n_f+k_1))\mathrm{mod}(N_{RB}^{max,DL}-1)$$

or $$m_0=0,1$$

$$m'=m_0+N_{RB}^{max,DL}-1+(k_0(n_f+k_1))\mathrm{mod}\ N_{RB}^{max,DL}.$$

In the foregoing formula, the index m' that is of the reference signal and that is determined based on the frame number $n_f$ of the radio frame is a function of the frame number $n_f$ of the radio frame, $n_f$ represents the frame number of the radio frame, and $N_{RB}^{max,DL}$ represents a maximum quantity of RBs supported by the system. For the NPRS, $N_{RB}^{max,DL}=110$. $k_0$ is an integer not equal to 0, for example, $k_0=1$ or $k_0=-1$. $k_1$ is an integer. For example, $k_1=0$, $k_1=1$, or $k_1=110$.

When NB-IoT is deployed in-band:

$$m_1=0,1$$

$$m'=m_1+N_{RB}^{max,DL}+(2\dot{n}_{PRB}'-\tilde{n}+k_2(n_f+k_3))\mathrm{mod}(N_{RB}^{max,DL}-1),\ \mathrm{or}$$

$$m_1=0,1$$

$$m'=m_1+N_{RB}^{max,DL}-1+(2\dot{n}_{PRB}'-\tilde{n}+k_2(n_f+k_3))\mathrm{mod}\ N_{RB}^{max,DL}.$$

In the foregoing formula, the index m' that is of the reference signal and that is determined based on the frame number $n_f$ of the radio frame is a function of the frame number $n_f$ of the radio frame, $n_f$ represents the frame number of the radio frame, $\dot{n}_{PRB}$ is used to determine an index of an RB occupied by the NPRS and is configured by the network device, and ñ is used to indicate that a quantity of RBs corresponding to an LTE system bandwidth is an odd number or an even number. When ñ=1, it represents that the quantity of RBs corresponding to the LTE system bandwidth is an odd number. When ñ=0, it represents that the quantity of RBs corresponding to the LTE system bandwidth is an even number. $N_{RB}^{max,DL}$ represents a maximum quantity of RBs supported by the system. For the NPRS, $N_{RB}^{max,DL}=110$. $k_2$ is an integer not equal to 0, for example, $k_2=1$ or $k_2=-1$. $k_3$ is an integer, for example, $k_3=0$, $k_3=1$, or $k_3=110$.

The PRS in the LTE system is used as an example. When the network device is not configured with PRS frequency hopping:

$$m_2=0,1,\ldots,2\cdot N_{RB}^{PRS}-1$$

$$m'=m_2+N_{RB}^{max,DL}+(k_4(n_f+k_5)-N_{RB}^{PRS})\mathrm{mod}(N_{RB}^{max,DL}-N_{RB}^{PRS}),\ \mathrm{or}$$

$$m_2=0,1,\ldots,2\cdot N_{RB}^{PRS}-1$$

$$m'=m_2+N_{RB}^{max,DL}-N_{RB}^{PRS}+(k_4(n_f+k_5)-N_{RB}^{PRS})\mathrm{mod}\ N_{RB}^{max,DL}.$$

In the foregoing formula, the index m' that is of the reference signal and that is determined based on the frame number $n_f$ of the radio frame is a function of the frame number $n_f$ of the radio frame, $n_f$ represents the frame number of the radio frame, and $N_{RB}^{max,DL}$ represents a maximum quantity of RBs supported by the system. For the PRS, $N_{RB}^{max,DL}=110$, and $N_{RB}^{PRS}$ represents the quantity of RBs occupied by the PRS and is configured by the network device. $k_4$ is an integer not equal to 0, for example, $k_4=1$ or $k_4=-1$. $k_5$ is an integer, for example, $k_5=0$, $k_5=1$, or $k_5=110$.

When the network device is configured with PRS frequency hopping:

$$m_3=0,1,\ldots,2\cdot N_{RB}^{PRS}-1$$

$$m'=m_3+N_{RB}^{max,DL}+(k_6(n_f+k_7)+n_i^{RB}-N_{RB}^{PRS})\mathrm{mod}(N_{RB}^{max,DL}-N_{RB}^{PRS}),\ \mathrm{or}$$

$$m_3=0,1,\ldots,2\cdot N_{RB}^{PRS}-1$$

$$m'=m_3+N_{RB}^{max,DL}-N_{RB}^{PRS}+(k_6(n_f+k_7)+n_i^{RB}-N_{RB}^{PRS})\mathrm{mod}\ N_{RB}^{max,DL}.$$

In the foregoing formula, the index m' that is of the reference signal and that is determined based on the frame number $n_f$ of the radio frame is a function of the frame number $n_f$ of the radio frame, $n_f$ represents the frame number of the radio frame, and $N_{RB}^{max,DL}$ represents a maximum quantity of RBs supported by the system. For the PRS, $N_{RB}^{max,DL}=110$, $n_i^{RB}$ is used to determine starting RB index of RS frequency hopping, and $N_{RB}^{PRS}$ represents the quantity of RBs occupied by the PRS and is configured by the network device. $k_6$ is an integer not equal to 0, for example, $k_6=1$ or $k_6=-1$. $k_7$ is an integer, for example, $k_7=0$, $k_7=1$, or $k_7=110$.

Specifically, after generating the reference signal sequence, the sending device determines, in the reference signal sequence based on the frame number of the radio frame, an index (for example, the first index set) of the at least a part of reference signals to be sent to the receiving device.

In another implementation, the index m' that is of the reference signal and that is determined by the sending device based on the frame number of the radio frame meets the following formula:

$$m'=(m_0'+N_{RE}N_{RB}'(k_8(n_f+k_9)))\mathrm{mod}(N_{RE}N_{RB}).$$

$n_f$ represents the frame number of the radio frame, the index m' of the reference signal is determined based on the frame number $n_f$ of the radio frame, and $n_f$ represents the frame number of the radio frame. $N_{RB}$ is a quantity of RBs (for example, $N_{RB}$ is a maximum quantity of resource blocks in a system or is a quantity of resource blocks actually occupied for reference signal transmission), $N_{RE}$ is a quantity of resource elements REs used for reference signal transmission on any symbol in one RB, and $N_{RB}'$ is quantity of resource blocks actually occupied for reference signal transmission. $k_8$ is an integer not equal to 0, for example, $k_8=1$ or $k_s=-1$. $k_9$ is an integer, for example, $k_9=0$, $k_9=1$, or $k_9=110$. $m_0'$ may be related to a communications system and a type of the reference signal, and may be determined according to a rule agreed on in the prior art.

The NPRS in the NB-IoT system is used as an example. When $N_{RE}=2$, $N_{RB}'=1$, and $N_{RB}=110$ or 100, $$m'=(m_0'+2n_f)\mathrm{mod}\ 220,\ \mathrm{or}$$

$$m'=(m_0'+2(n_f+1))\mathrm{mod}\ 220,\ \mathrm{or}$$

$$m'=(m_0'+2n_f)\mathrm{mod}\ 200,\ \mathrm{or}$$

$$m'=(m_0'+2(n_f+1))\mathrm{mod}\ 200.$$

When the NB-IoT is deployed in the guard band or independently deployed, $m_0'$ may be determined according to the following formula:

$$m_{01}=0,1$$

$$m_0'=m_{01}+N_{RB}^{max,DL}-1,$$

where $N_{RB}^{max,DL}$ indicates the maximum quantity of RBs supported by the system, and for the NPRS, $N_{RB}^{max,DL}=110$.

When the NB-IoT is deployed in-band, $m_0'$ is determined according to the following formula:

$$m_{01}=0,1$$

$$m_0'=m_{01}+2\dot{n}_{PRB}'+N_{RB}^{max,DL}-\tilde{n}.$$

$\dot{n}_{PRB}'$ is used to determine the index of the RB occupied by the NPRS and is configured by the network device, and $\tilde{n}$ is used to indicate that the quantity of RBs corresponding to the LTE system bandwidth is an odd number or an even number. When $\tilde{n}=1$, it represents that the quantity of RBs corresponding to the LTE system bandwidth is an odd number. When $\tilde{n}=0$, it represents that the quantity of RBs corresponding to the LTE system bandwidth is an even number, and $N_{RB}^{max,DL}$ represents the maximum quantity of RBs supported by the system. For the NPRS, $N_{RB}^{max,DL}=110$.

The PRS in the LTE system is used as an example. When $N_{RE}=2$, $N_{RB}'=N_{RB}^{PRS}$, $N_{RB}=110$ or 100, and $N_{RB}^{PRS}$ indicates the quantity of RBs occupied by the PRS, $$m'=(m_0'+2N_{RB}^{PRS}n_f)\mod 220, \text{ or}$$

$$m'=(m_0'+2N_{RB}^{PRS}(n_f+1))\mod 220, \text{ or}$$

$$m'=(m_0'+2N_{RB}^{PRS}n_f)\mod 200, \text{ or}$$

$$m'=(m_0'+2N_{RB}^{PRS}(n_f+1))\mod 200$$

When the network device is not configured with the PRS frequency hopping, $m_0'$ may be determined according to the following formula:

$$m_{02}=0,1,\ldots,2\cdot N_{RB}^{PRS}-1$$

$$m_0'=m_{02}+N_{RB}^{max,DL}-N_{RB}^{PRS}.$$

$N_{RB}^{max,DL}$ indicates the maximum quantity of RBs supported by the system. For the PRS, $N_{RB}^{max,DL}=110$, and $N_{RB}^{PRS}$ indicates the quantity of RBs occupied by the PRS and is configured by the network device.

When the network device is configured with the PRS frequency hopping, $m_0'$ may be determined according to the following formula:

$$m_{02}=0,1,\ldots,2\cdot N_{RB}^{PRS}-1$$

$$m_0'=m_{02}+n_i^{RB}+N_{RB}^{max,DL}-N_{RB}^{DL}.$$

$N_{RB}^{max,DL}$ indicates the maximum quantity of RBs supported by the system. For the PRS, $N_{RB}^{max,DL}=110$, $n_i^{RB}$ is used to determine the index of the start RB corresponding to the frequency hopping, $N_{RB}^{PRS}$ indicates the quantity of RBs occupied by the PRS, and $N_{RB}^{DL}$ indicates the quantity of RBs corresponding to a transmission bandwidth of the LTE system.

Specifically, after generating the reference signal sequence, the sending device determines, in the reference signal sequence based on the frame number of the radio frame and the reference signal identifier, an index (for example, the first index set) of the at least a part of reference signals to be sent to the receiving device.

In still another implementation, the index m' that is of the reference signal and that is determined by the sending device based on the frame number of the radio frame and the reference signal identifier meets the following formula:

$$m'=(m_0'+N_{RE}N_{RB}'(k_{10}(n_f+k_{11})\cdot(k_{12}(n_{ID}^{RS} \mod k_{13})+k_{14})))\mod(N_{RE}N_{RB}).$$

$n_f$ represents the frame number of the radio frame, the index m' of the reference signal is determined based on the frame number $n_f$ of the radio frame and the reference signal identifier $n_{ID}^{RS}$, $n_f$ represents the frame number of the radio frame, and $n_{ID}^{RS}$ represents the reference signal identifier. $N_{RB}$ is the quantity of RBs (for example, $N_{RB}$ is a maximum quantity of resource blocks in the system or is a quantity of resource blocks actually occupied for reference signal transmission), $N_{RE}$ is a quantity of resource elements REs used for reference signal transmission on any symbol in one RB, and $N_{RB}'$ is quantity of resource blocks actually occupied for reference signal transmission. $k_{10}$ is an integer not equal to 0, for example, $k_{10}=1$ or $k_{10}=-1$. $k_{11}$ is an integer, for example, $k_{11}=0$, $k_{11}=1$, or $k_{11}=110$. $k_{12}$ is an integer not equal to 0, for example, $k_{12}=1$ or $k_{12}=-1$. $k_{13}$ is an integer, for example, $k_{13}=0$, $k_{13}=1$, or $k_{13}=512$. $k_{14}$ is an integer, for example, $k_{14}=0$, $k_{14}=-1$, or $k_{14}=110$. $m_0'$ is related to a communications system and a type of the reference signal, and may be determined according to a rule agreed on in the prior art.

The NPRS in the NB-IoT system is used as an example. When $N_{RE}=2$, $N_{RB}'=1$, $N_{RB}=110$ or 100, $n_{ID}^{RS}=N_{ID}^{NPRS}$, $$m'=(m_0'+2n_fN_{ID}^{NPRS})\mod 220, \text{ or}$$

$$m'=(m_0'+2(n_fN_{ID}^{NPRS}+1))\mod 220, \text{ or}$$

$$m'=(m_0'+2n_fN_{ID}^{NPRS})\mod 200, \text{ or}$$

$$m'=(m_0'+2(n_fN_{ID}^{NPRS}+1))\mod 200, \text{ or}$$

$$m'=(m_0'+2(n_f+1)(N_{ID}^{NPRS}+1))\mod 220, \text{ or}$$

$$m'=(m_0'+2(n_f+1)(N_{ID}^{NPRS}+1))\mod 200, \text{ or}$$

$$m'=(m_0'+2(n_f+1)(N_{ID}^{NPRS} \mod 512+1))\mod 220, \text{ or}$$

$$m'=(m_0'+2(n_f+1)(N_{ID}^{NPRS} \mod 512+1))\mod 200.$$

When the NB-IoT is deployed in the guard band or independently deployed, $m_0'$ may be determined according to the following formula:

$$m_{01}=0,1$$

$$m_0'=m_{01}+N_{RB}^{max,DL}-1$$

where $N_{RB}^{max,DL}$ indicates the maximum quantity of RBs supported by the system, and for the NPRS, $N_{RB}^{max,DL}=110$.

When the NB-IoT is deployed in-band, $m_0'$ may be determined according to the following formula:

$$m_{01}=0,1$$

$$m_0'=m_{01}+2\dot{n}_{PRB}'+N_{RB}^{max,DL}-\tilde{n}.$$

$\dot{n}_{PRB}'$ is used to determine the index of the RB occupied by the NPRS and is configured by the network device, and $\tilde{n}$ is used to indicate that the quantity of RBs corresponding to the LTE system bandwidth is an odd number or an even number. When $\tilde{n}=1$, it represents that the quantity of RBs corresponding to the LTE system bandwidth is an odd number. When $\tilde{n}=0$, it represents that the quantity of RBs corresponding to the LTE system bandwidth is an even number, and $N_{RB}^{max,DL}$ represents the maximum quantity of RBs supported by the system. For the NPRS, $N_{RB}^{max,DL}=110$.

The PRS in the LTE system is used as an example. When $N^{RE}=2$, $N_{RB}'=N_{RB}^{PRS}$, $N_{RB}=110$ or 100, $N_{RB}^{PRS}$ indicates the quantity of RBs occupied by the PRS, and $n_{ID}^{RS}=N_{ID}^{PRS}$, $m'=(m_0'+2N_{RB}^{PRS}n_f N_{ID}^{PRS})\mod 220$, or $m'=(m_0'+2N_{RB}^{PRS}(n_f N_{ID}^{PRS}+1))\mod 220$, or $m'=(m_0'+2N_{RB}^{PRS}n_f N_{ID}^{PRS})\mod 200$, or $m'=(m_0'+2N_{RB}^{PRS}(n_f N_{ID}^{PRS}+1))\mod 200$, or $m'=(m_0'+2N_{RB}^{PRS}(n_f+1)(N_{ID}^{PRS}+1))\mod 220$, or $m'=(m_0'+2N_{RB}^{PRS}(n_f+1)(N_{ID}^{PRS}+1))\mod 220$, or $m'=(m_0'+2N_{RB}^{PRS}(n_f+1)(N_{ID}^{PRS}\mod 512+1))\mod 220$, or $m'=(m_0'+2N_{RB}^{PRS}(n_f+1)(N_{ID}^{PRS}\mod 512+1))\mod 200$.

When the network device is not configured with the PRS frequency hopping, $m_0'$ may be determined according to the following formula:

$m_{02}=0,1,\ldots,2\cdot N_{RB}^{PRS}-1$ $m_0'=m_{02}+N_{RB}^{max,DL}-N_{RB}^{PRS}$.

$N_{RB}^{max,DL}$ indicates the maximum quantity of RBs supported by the system. For the PRS, $N_{RB}^{max,DL}=110$, and $N_{RB}^{PRS}$ indicates the quantity of RBs occupied by the PRS and is configured by the network device.

When the network device is configured with the PRS frequency hopping, $m_0'$ may be determined according to the following formula:

$m_{02}=0,1,\ldots,2\cdot N_{RB}^{PRS}-1$ $m_0'=m_{02}+n_i^{RB}+N_{RB}^{max,DL}-N_{RB}^{DL}$.

$N_{RB}^{max,DL}$ indicates the maximum quantity of RBs supported by the system. For the PRS, $N_{RB}^{max,DL}=110$, $N_i^{RB}$ is used to determine the index of the start RB corresponding to the frequency hopping, $N_{RB}^{PRS}$ indicates the quantity of RBs occupied by the PRS, and $N_{RB}^{DL}$ indicates the quantity of RBs corresponding to a transmission bandwidth of the LTE system.

303: Map the at least a part of reference signals to a resource position that corresponds to the radio frame and that is used to transmit the at least a part of reference signals.

304: Send the at least a part of reference signals or an orthogonal reference signal at the resource position, where the orthogonal reference signal is obtained by multiplying the at least a part of reference signals by a preset orthogonal code.

Specifically, the sending device maps, to the at least one resource position corresponding to the radio frame, the reference signal that is of the determined first index set and that is indicated in the reference signal sequence, and sends the at least a part of reference signals to the receiving device on the at least one resource; or the sending device sends an orthogonal reference signal to the receiving device at the at least one resource position, and the orthogonal reference signal is obtained by multiplying the at least a part of reference signals by the preset orthogonal code.

An index of a reference signal that needs to be sent to the receiving device is determined in the generated reference signal sequence based on the frame number of the radio frame, so that indexes of reference signals that need to be sent to the receiving device and that are determined in the reference signal sequence based on different frame numbers of radio frames are different. In this way, reference signals in radio frames that have different frame numbers and that are sent to the receiving device are different, so that when the receiving device performs in-phase combination on received reference signal sequences in a plurality of radio frames, interference caused by a reference signal of an interfering cell to a reference signal of a target cell is reduced.

Optionally, in step 302, that the sending device determines a first index set based on a frame number of a radio frame includes: performing a modulo operation on the frame number of the radio frame based on a preset value K, where K is a positive integer; and determining the first index set based on a value resulting from the frame number of the radio frame mod K.

Specifically, after generating the reference signal sequence, the sending device performs a modulo operation on the frame number of the radio frame by using a preset value K, and based on the value resulting from the frame number of the radio frame mod K, determines, in the reference signal sequence, the index (for example, the first index set) of the at least a part of reference signals to be sent to the receiving device.

For example, the index of the reference signal that is determined by the sending device based on the value resulting from the frame number of the radio frame mod K meets the following formula:

$m'=f(n_f \mod K)$, where $n_f$ represents the frame number of the radio frame, and $f(n_f \mod K)$ represents a function or a mapping of the frame number $n_f$ of the radio frame and the value $n_f \mod K$ resulting from performing a modulo operation by using a modulo K.

The following uses the NPRS of the NB-IoT system as an example. When the NB-IoT is deployed in the guard band or independently deployed:

$m_0=0,1$ $m'=m_0+N_{RB}^{max,DL}+(k_0(n_f \mod K+k_1))\mod (N_{RB}^{max,DL}-1)$, or $m_0=0,1$ $m'=m_0+N_{RB}^{max,DL}-1+(k_0(n_f \mod K+k_1))\mod N_{RB}^{max,DL}$.

In the foregoing formula, the index m' of the reference signal that is determined based on the frame number $n_f$ of the radio frame and the value $n_f \mod K$ resulting from performing a modulo operation by using the modulo K is a function of the frame number $n_f$ of the radio frame and the value $n_f \mod K$ resulting from performing a modulo operation by using the modulo K, $n_f$ represents the frame number of the radio frame, and $N_{RB}^{max,DL}$ represents the maximum quantity of RBs supported by the system. For the NPRS, $N_{RB}^{max,DL}=110$, K is a modulo, and K is a positive integer, for example, K=64 or 128. $k_0$ is an integer not equal to 0, for example, $k_0=1$ or $k_0=-1$. $k_1$ is an integer, for example, $k_1=0$, $k_1=1$, or $k_1=110$.

When NB-IoT is deployed in-band:

$m_1=0,1$ $m'=m_1+N_{RB}^{max,DL}+(2\tilde{n}^{PRB'}-\tilde{n}+k_2(n_f \mod K+k_3))\mod (N_{RB}^{max,DL}-1$, or $m_1=0,1$ $m'=m_1+N_{RB}^{max,DL}-1+(2\tilde{n}_{PRB}'-\tilde{n}+k_2(n_f \mod K+k_3)) \mod N_{RB}^{max,DL}$.

In the foregoing formula, the index m' that is of the reference signal and that is determined based on the frame number $n_f$ of the radio frame and the value $n_f$ mod K resulting from performing a modulo operation by using the modulo K is a function of the frame number $n_f$ of the radio frame and the value $n_f$ mod K resulting from performing a modulo operation by using the modulo K, $n_f$ represents the frame number of the radio frame, $\dot{n}_{PRB}$ is used to determine an index of an RB occupied by the NPRS, and ñ, configured by the network device, is used to indicate that a quantity of RBs corresponding to an LTE system bandwidth is an odd number or an even number. When ñ=1, it represents that the quantity of RBs corresponding to the LTE system bandwidth is an odd number. When ñ=0, it represents that the quantity of RBs corresponding to the LTE system bandwidth is an even number, and $N_{RB}^{max,DL}$ represents a maximum quantity of RBs supported by the system. For the NPRS, $N_{RB}^{max,DL}$=110. K is a modulo, and K is a positive integer, for example, K=64 or 128. $k_2$ is an integer not 0, for example, $k_2$=1 or $k_2$=−1. $k_3$ is an integer, for example, $k_3$=0, $k_3$=1, or $k_3$=110.

The PRS in the LTE system is used as an example. When the network device is not configured with PRS frequency hopping:

$$m_2=0,1,\ldots,2\cdot N_{RB}^{PRS}-1$$

$$m'=m_2+N_{RB}^{max,DL}+(k_4(n_f \bmod K+k_5)-N_{RB}^{PRS})\bmod (N_{RB}^{max,DL}-N_{RB}^{PRS}), \text{ or}$$

$$m_2=0,1,\ldots,2\cdot N_{RB}^{PRS}-1$$

$$m'=m_2+N_{RB}^{max,DL}-N_{RB}^{PRS}+(k_4(n_f \bmod K+k_5)-N_{RB}^{PRS})\bmod N_{RB}^{max,DL}.$$

In the foregoing formula, the index m' of the reference signal that is determined based on the frame number $n_f$ of the radio frame and the value $n_f$ mod K resulting from performing a modulo operation by using the modulo K is a function of the frame number $n_f$ of the radio frame and the value $n_f$ mod K resulting from performing a modulo operation by using the modulo K, $n_f$ represents the frame number of the radio frame, and $N_{RB}^{max,DL}$ represents the maximum quantity of RBs supported by the system. For the PRS, $N_{RB}^{max,DL}$=110, $N_{RB}^{max,DL}$ indicates a quantity of RBs occupied by the PRS and is configured by a network device. K is a modulo, and K is a positive integer, for example, K=64 or 128. $k_4$ is an integer not 0, for example, $k_4$=1 or $k_4$=−1. $k_5$ is an integer, for example, $k_5$=0, $k_5$=1, or $k_5$=110.

When the network device is configured with PRS frequency hopping:

$$m_3=0,1,\ldots,2\cdot N_{RB}^{PRS}-1$$

$$m'=m_3+N_{RB}^{max,DL}+(k_6(n_f \bmod K+k_7)+n_i^{RB}-N_{RB}^{PRS})\bmod(N_{RB}^{max,DL}-N_{RB}^{PRS}), \text{ or}$$

$$m_3=0,1,\ldots,2\cdot N_{RB}^{PRS}-1$$

$$m'=m_3+N_{RB}^{max,DL}-N_{RB}^{PRS}+(k_6(n_f \bmod K+k_7)+n_i^{RB}-N_{RB}^{PRS})\bmod N_{RB}^{max,DL}.$$

In the foregoing formula, the index m' of the reference signal that is determined based on the frame number $n_f$ of the radio frame and the value $n_f$ mod K resulting from performing a modulo operation by using the modulo K is a function of the frame number $n_f$ of the radio frame and the value $n_f$ mod K resulting from performing a modulo operation by using the modulo K, $n_f$ represents the frame number of the radio frame, and $N_{RB}^{max,DL}$ represents the maximum quantity of RBs supported by the system. For the PRS, $N_{RB}^{max,DL}$=110, $n_i^{RB}$ is used to determine an index of a start RB corresponding to the frequency hopping, $N_{RB}^{PRS}$ indicates a quantity of RBs occupied by the PRS and is configured by the network device K is a modulo, and K is a positive integer, for example, K=64 or 128 $k_6$ is an integer not 0, for example, $k_6$=1 or $k_6$=−1. $k_7$ is an integer, for example, $k_7$=0, $k_7$=1, or $k_7$=110.

After generating the reference signal sequence, the sending device performs a modulo operation on the frame number of the radio frame by using a preset value K, and based on a value resulting from the frame number of the radio frame mod K and the reference signal identifier, determines, in the reference signal sequence, the index (for example, the first index set) of the at least a part of reference signals to be sent to the receiving device.

In another implementation, the index m' that is of the reference signal and that is determined by the sending device based on the value resulting from the frame number of the radio frame mod K meets the following formula:

$$m'=(m_0'+N_{RE}N_{RB}'(k_8(n_f \bmod K+k_9)))\bmod(N_{RE}N_{RB}).$$

$n_f$ represents the frame number of the radio frame, the index m' of the reference signal is determined based on the value $n_f$ mod K resulting from the frame number of the radio frame mod K, and $n_f$ represents the frame number of the radio frame. K is a modulo, and K is a positive integer, for example, K=64 or 128. $N_{RB}$ is the quantity of RBs (for example, $N_{RB}$ is a maximum quantity of resource blocks in the system or is a quantity of resource blocks actually occupied for reference signal transmission), $N_{RE}$ is a quantity of resource elements REs used for reference signal transmission on any symbol in one RB, and $N_{RB}'$ is quantity of resource blocks actually occupied for reference signal transmission. $k_8$ is an integer not equal to 0, for example, $k_8$=1 or $k_8$=−1. $k_9$ is an integer, for example, $k_9$=0, $k_9$=1, or $k_9$=110. $m_0'$ is related to a communications system and a type of the reference signal, and may be determined according to a rule agreed on in the prior art.

The NPRS in the NB-IoT system is used as an example. When $N_{RE}$=2, $N_{RB}'$=, $N_{RB}$=110 or 100, and K=64 or 128, $$m'=(m_0'+2n_f \bmod 64)\bmod 220, \text{ or}$$

$$m'=(m_0'+2(n_f \bmod 64+1))\bmod 220, \text{ or}$$

$$m'=(m_0'+2n_f \bmod 64)\bmod 200, \text{ or}$$

$$m'=(m_0'+2(n_f \bmod 64+1))\bmod 200, \text{ or}$$

$$m'=(m_0'+2n_f \bmod 128)\bmod 220, \text{ or}$$

$$m'=(m_0'+2(n_f \bmod 128+1))\bmod 220, \text{ or}$$

$$m'=(m_0'+2n_f \bmod 128)\bmod 200, \text{ or}$$

$$m'=(m_0'+2(n_f \bmod 128+1))\bmod 200.$$

When the NB-IoT is deployed in the guard band or independently deployed, $m_0'$ may be determined according to the following formula:

$$m_{01}=0,1$$

$$m_0'=m_{01}+N_{RB}^{max,DL}-1,$$

where
$N_{RB}^{max,DL}$ indicates the maximum quantity of RBs supported by the system, and for the NPRS, $N_{RB}^{max,DL}$=110.

When the NB-IoT is deployed in-band, $m_0'$ is determined according to the following formula:

$$m_{01}=0,1$$

$$m_0'=m_{01}+2\dot{n}_{PRB}'+N_{RB}^{max,DL}-\tilde{n}.$$

$\dot{n}_{PRB}'$ is used to determine the index of the RB occupied by the NPRS, and $\tilde{n}$, configured by the network device, is used to indicate that the quantity of RBs corresponding to the LTE system bandwidth is an odd number or an even number. When $\tilde{n}=1$, it represents that the quantity of RBs corresponding to the LTE system bandwidth is an odd number. When $\tilde{n}=0$, it represents that the quantity of RBs corresponding to the LTE system bandwidth is an even number, and $N_{RB}^{max,DL}$ represents the maximum quantity of RBs supported by the system. For the NPRS, $N_{RB}^{max,DL}=110$.

The PRS in the LTE system is used as an example. When $N_{RE}=2$, $N_{RB}'=N_{RB}^{PRS}$, $N_{RB}=110$ or $100$, $N_{RB}^{PRS}$ indicates the quantity of RBs occupied by the PRS, and K=64 or 128, $$m'=(m_0'+2N_{RB}^{PRS}n_f \bmod 64)\bmod 220, \text{ or}$$

$$m'=(m_0'+2N_{RB}^{PRS}(n_f \bmod 64+1))\bmod 220, \text{ or}$$

$$m'=(m_0'+2N_{RB}^{PRS}n_f \bmod 64)\bmod 200, \text{ or}$$

$$m'=(m_0'+2N_{RB}^{PRS}(n_f \bmod 64+1))\bmod 200, \text{ or}$$

$$m'=(m_0'+2N_{RB}^{PRS}n_f \bmod 128)\bmod 220, \text{ or}$$

$$m'=(m_0+2N_{RB}^{PRS}(n_f \bmod 128+1))\bmod 220, \text{ or}$$

$$m'=(m_0'+2N_{RB}^{PRS}n_f \bmod 128)\bmod 200, \text{ or}$$

$$m'=(m_0+2NN_{RB}^{PRS}(n_f \bmod 128+1))\bmod 200.$$

When the network device is not configured with the PRS frequency hopping, $m_0'$ may be determined according to the following formula:

$$m_{02}=0,1,\ldots,2\cdot N_{RB}^{PRS}-1$$

$$m_0'=m_{02}+N_{RB}^{max,DL}-N_{RB}^{PRS}.$$

$N_{RB}^{max,DL}$ indicates the maximum quantity of RBs supported by the system. For the PRS, $N_{RB}^{max,DL}=110$, and $N_{RB}^{PRS}$ indicates the quantity of RBs occupied by the PRS, and is configured by the network device.

When the network device is configured with the PRS frequency hopping, $m_0'$ may be determined according to the following formula:

$$m_{02}=0,1,\ldots,2\cdot N_{RB}^{PRS}-1$$

$$m_0'=m_{02}+n_i^{RB}+N_{RB}^{max,DL}-N_{RB}^{DL}.$$

$N_{RB}^{max,DL}$ indicates the maximum quantity of RBs supported by the system. For the PRS, $N_{RB}^{max,DL}=110$, $n_i^{RB}$ is used to determine the index of the start RB corresponding to the frequency hopping, $N_{RB}^{PRS}$ indicates the quantity of RBs occupied by the PRS, and $N_{RB}^{DL}$ indicates the quantity of RBs corresponding to a transmission bandwidth of the LTE system.

After generating the reference signal sequence, the sending device performs a modulo operation on the frame number of the radio frame based on a preset value K, and based on a value resulting from the frame number of the radio frame mod K, determines, in the reference signal sequence, the index (for example, the first index set) of the at least a part of reference signals to be sent to the receiving device.

In still another implementation, the index m' that is of the reference signal and that is determined by the sending device based on the value resulting from the frame number of the radio frame mod K and the reference signal identifier meets the following formula:

$$m'=(m_0'+N_{RE}N_{RB}'(k_{10}(n_f \bmod K+k_{11})\cdot(k_{12}(n_{ID}^{RS} \bmod k_{13})+k_{14})))\bmod(N_{RE}N_{RB}).$$

$n_f$ represents the frame number of the radio frame, the index m' of the reference signal is determined based on the value $n_f \bmod K$ resulting from performing a modulo operation by using the frame number $n_f \bmod K$ of the radio frame and the reference signal identifier $n_{ID}^{RS}$, $n_f$ represents the frame number of the radio frame, and $n_{ID}^{RS}$ represents the reference signal identifier. K is a modulo, and K is a positive integer, for example, K=64 or 128. $N_{RB}$ is the quantity of RBs (for example, $N_{RB}$ is a maximum quantity of resource blocks in the system or is a quantity of resource blocks actually occupied for reference signal transmission), $N_{RE}$ is a quantity of resource elements REs used for reference signal transmission on any symbol in one RB, and $N_{RB}'$ is a quantity of resource blocks actually occupied for reference signal transmission. $k_{10}$ is an integer not equal to 0, for example, $k_{10}=1$ or $k_{10}=-1$. k is an integer, for example, $k_{11}=0$, $k_{11}=1$, or $k_{11}=110$. $k_{12}$ is an integer not equal to 0, for example, $k_{12}=1$ or $k_{12}=-1$. $k_{13}$ is an integer, for example, $k_{13}=0$, $k_{13}=1$, or $k_{13}=512$. $k_{14}$ is an integer, for example, $k_{14}=0$, $k_{14}=1$, or $k_{14}=110$. $m_0'$ is related to a communications system and a type of the reference signal, and may be determined according to a rule agreed on in the prior art.

The NPRS in the NB-IoT system is used as an example. When $N^{RE}=2$, $N_{RB}'=1$, $N_{RB}=110$ or $100$, $n_{ID}^{RS}=N_{ID}^{NPRS}$, and K=64 or 128, $$m'=(m_0'+2n_f \bmod 64\cdot N_{ID}^{NPRS})\bmod 220, \text{ or}$$

$$m'=(m_0'+2(n_f \bmod 64\cdot N_{ID}^{NPRS}+1))\bmod 220, \text{ or}$$

$$m=(m_0'+2n_f \bmod 64\cdot N_{ID}^{NPRS})\bmod 200, \text{ or}$$

$$m'=m_0'+2(n_f \bmod 64\cdot N_{ID}^{NPRS}+1))\bmod 200, \text{ or}$$

$$m'=(m_0'+2(n_f \bmod 64+1)(N_{ID}^{NPRS}+1))\bmod 220, \text{ or}$$

$$m'=(m_0'+2(n_f \bmod 64+1)(N_{ID}^{NPRS}+1)\bmod 200, \text{ or}$$

$$m'=(m_0'+2(n_f \bmod 64+1)(N_{ID}^{NPRS} \bmod 512+1))\bmod 220, \text{ or}$$

$$m=(m_0'+2(n_f \bmod 64+1)(N_{ID}^{NPRS} \bmod 512+1))\bmod 200, \text{ or}$$

$$m'=(m_0+2(n_f \bmod 128+1)(N_{ID}^{NPRS}+1))\bmod 220, \text{ or}$$

$$m'=(m_0'+2(n_f \bmod 128+1)(N_{ID}^{NPRS}+1))\bmod 200, \text{ or}$$

$$m'=(m_0'+2(n_f \bmod 128+1)(N_{ID}^{NPRS} \bmod 512+1))\bmod 220, \text{ or}$$

$$m'=(m_0'+2(n_f \bmod 128+1)(N_{ID}^{NPRS} \bmod 512+1))\bmod 200.$$

When the NB-IoT is deployed in-band or independently deployed, $m_0'$ may be determined according to the following formula:

$$m_{01}=0,1$$

$$m_0'=m_{01}+N_{RB}^{max,DL}-1,$$

where $N_{RB}^{max,DL}$ indicates the maximum quantity of RBs supported by the system, and for the NPRS, $N_{RB}^{max,DL}=110$.

When the NB-IoT is deployed in-band, $m_0'$ is determined according to the following formula:

$$m_{01}=0,1$$

$$m_0'=m_{01}+2\dot{n}_{PRB}'+N_{RB}^{max,DL}-\tilde{n}.$$

$\tilde{n}_{PRB}{}'$ is used to determine the index of the RB occupied by the NPRS and is configured by the network device, and $\tilde{n}$ is used to indicate that the quantity of RBs corresponding to the LTE system bandwidth is an odd number or an even number. When $\tilde{n}=1$, it represents that the quantity of RBs corresponding to the LTE system bandwidth is an odd number. When $\tilde{n}=0$, it represents that the quantity of RBs corresponding to the LTE system bandwidth is an even number, and $N_{RB}{}^{max,DL}$ represents the maximum quantity of RBs supported by the system. For the NPRS, $N_{RB}{}^{max,DL}=110$.

The PRS in the LTE system is used as an example. When $N_{RE}=2$, $N_{RB}{}'=N_{RB}{}^{PRS}$, $N_{RB}=110$ or $100$, $N_{RB}{}^{PRS}$ indicates the quantity of RBs occupied by the PRS, $n_{ID}{}^{RS}=N_{ID}{}^{PRS}$, and $K=64$ or $128$, $$m'=(m_0{}'+2N_{RB}{}^{PRS}\cdot n_f \bmod 64 \cdot N_{ID}{}^{PRS}) \bmod 220, \text{ or}$$

$$m'=(m_0{}'+2N_{RB}{}^{PRS}(n_f \bmod 64 \cdot N_{ID}{}^{PRS}+1)) \bmod 220, \text{ or}$$

$$m'=(m_0{}'+2N_{RB}{}^{PRS}\cdot n_f \bmod 64 \cdot N_{ID}{}^{PRS}) \bmod 200, \text{ or}$$

$$m'=(m_0{}'+2N_{RB}{}^{PRS}(n_f \bmod 64 \cdot N_{ID}{}^{PRS}+1)) \bmod 200, \text{ or}$$

$$m'=(m_0{}'+2N_{RB}{}^{PRS}(n_f \bmod 64+1)(N_{ID}{}^{PRS}+1)) \bmod 220, \text{ or}$$

$$m'=(m_0{}'+2N_{RB}{}^{PRS}(n_f \bmod 64+1)(N_{ID}{}^{PRS}+1)) \bmod 200, \text{ or}$$

$$m'=(m_0{}'+2N_{RB}{}^{PRS}(n_f \bmod 64+1)(N_{ID}{}^{PRS} \bmod 512+1)) \bmod 220, \text{ or}$$

$$m'=(m_0{}'+2N_{RB}{}^{PRS}(n_f \bmod 64+1)(N_{ID}{}^{PRS} \bmod 512+1)) \bmod 200, \text{ or}$$

$$m'=(m_0{}'+2N_{RB}{}^{PRS}(n_f \bmod 128+1)(N_{ID}{}^{PRS}+1)) \bmod 220, \text{ or}$$

$$m'=(m_0{}'+2N_{RB}{}^{PRS}(n_f \bmod 128+1)(NN_{ID}{}^{PRS}+1)) \bmod 200, \text{ or}$$

$$m'=(m_0{}'+2N_{RB}{}^{PRS}(n_f \bmod 128+1)(N_{ID}{}^{PRS} \bmod 521+1)) \bmod 220, \text{ or}$$

$$m'=(m_0{}'+2N_{RB}{}^{PRS}(n_f \bmod 128+1)(N_{ID}{}^{PRS} \bmod 512+1)) \bmod 200.$$

When the network device is not configured with the PRS frequency hopping, $m_0{}'$ may be determined according to the following formula:

$$m_{02}=0,1,\ldots,2\cdot N_{RB}{}^{PRS}-1$$

$$m_0{}'=m_{02}+N_{RB}{}^{max,DL}-N_{RB}{}^{PRS}.$$

$N_{RB}{}^{max,DL}$ indicates the maximum quantity of RBs supported by the system. For the PRS, $N_{RB}{}^{max,DL}=110$, and $N_{RB}{}^{PRS}$ indicates the quantity of RBs occupied by the PRS, and is configured by the network device.

When the network device is configured with the PRS frequency hopping, $m_0{}'$ may be determined according to the following formula:

$$m_{02}=0,1,\ldots,2\cdot N_{RB}{}^{PRS}-1$$

$$m_0{}'=m_{02}+n_i{}^{RB}+N_{RB}{}^{max,DL}-N_{RB}{}^{DL}.$$

$N_{RB}{}^{max,DL}$ indicates the maximum quantity of RBs supported by the system. For the PRS, $N_{RB}{}^{max,DL}=110$, $n_i{}^{RB}$ is used to determine the start RB index corresponding to the frequency hopping, $N_{RB}{}^{PRS}$ indicates the quantity of RBs occupied by the PRS, and $N_{RB}{}^{DL}$ indicates the quantity of RBs corresponding to a transmission bandwidth of the LTE system.

For parameters in this application, the foregoing example provides some formulas that may be used to determine these parameters. These parameters may also be determined by using another formula. When these parameters are determined by using another formula, these parameters also meet the foregoing formulas.

The index of the reference signal that needs to be sent to the receiving device is determined in the generated reference signal sequence based on the value resulting from the frame number of the radio frame mod K, so that indexes of reference signals that need to be sent to the receiving device and that are determined in the reference signal sequence based on the value resulting from the frame number of the radio frame mod K are different. In this way, reference signals that are sent to the receiving device and that are in radio frames in which different values result from the frame number of the radio frame mod K are different, so that when the receiving device performs in-phase combination on the received reference signal sequences in the plurality of radio frames, interference caused by the reference signal of the interfering cell to the reference signal of the target cell is reduced.

In this embodiment of this application, the method 300 further includes the following steps.

305: The receiving device generates the reference signal sequence.

Specifically, the receiving device locally generates the reference signal sequence. The method for generating the reference signal sequence by the receiving device is the same as that described in the foregoing Method 1 to Method 6. For details, refer to the method for generating the reference signal sequence in the foregoing Method 1 to Method 6. For brevity, details are not described herein again.

306: The receiving device determines the resource position, where the resource position is a resource position that corresponds to the radio frame and that is used to transmit the at least a part of reference signals.

Specifically, before receiving the at least a part of reference signals sent by the sending device, the receiving device first determines the resource position carrying the at least a part of reference signals, to receive, at the resource position, the at least a part of reference signals sent by the sending device.

307: The receiving device receives, at the resource position, the at least a part of reference signals or the orthogonal reference signal sent by the sending device, where the orthogonal reference signal is obtained by multiplying the at least a part of reference signals by the preset orthogonal code.

Specifically, the receiving device receives, at the determined resource position, the at least a part of reference signals sent by the sending device, or the receiving device receives the orthogonal reference signal sent by the sending device, and the orthogonal reference signal is obtained by multiplying the at least a part of reference signals by the preset orthogonal code.

After receiving the at least a part of reference signals sent by the sending device, the receiving device selects at least a part of reference signals whose indexes are the same as indexes of at least a part of reference signals from a locally generated first reference signal subsequence, and correspondingly processes the at least a part of reference signals that are locally generated and the at least a part of reference signals that are received. A specific processing manner is related to a function of the reference signal.

For example, when the function of the reference signal is channel estimation, the receiving device obtains channel information based on the at least a part of reference signals that are locally generated and the at least a part of reference signals that are received.

When the function of the reference signal is frequency offset tracking, the receiving device obtains frequency offset information based on the at least a part of reference signals that are locally generated and the at least a part of reference signals that are received, and the frequency offset information may be used for data demodulation.

When the function of the reference signal is positioning, the receiving device obtains timing information based on the at least a part of reference signals that are locally generated and the at least a part of reference signals that are received, and the timing information may be used to assist in positioning.

In addition, an implementation of an observed time difference of arrival (OTDOA) positioning method is based on a time difference between a reference signal of a reference cell and a neighboring cell that is observed by a receiver of a terminal device. A plurality of network devices send reference signals to the terminal device, and the terminal device measures the reference signals sent by the plurality of network devices in the neighboring cell and the reference cell to obtain arrival time information, and then calculates a geographical position of the terminal device with reference to geographical positions of the plurality of network devices.

Based on the reference signal transmission method in this embodiment of this application, the terminal device needs to know the radio frame number of the neighboring cell or the reference cell or the value resulting from the radio frame number mod the modulo K. For the reference cell, the terminal device may obtain the frame number of the radio frame of the reference cell by using a synchronization signal and a system message of the reference cell.

A positioning server may notify the terminal device of a deviation between the frame number of the radio frame of the neighboring cell and the frame number of the radio frame of the reference cell, or the positioning server notifies the terminal device of a deviation between the frame number of the radio frame of the neighboring cell and the frame number of the radio frame of the reference cell and the value resulting from performing a modulo operation by using the modulo K', K' is a positive integer, for example, K'=64 or K'=128. It should be noted that the deviation between the frame number of the radio frame of the neighboring cell and the frame number of the radio frame of the reference cell refers to a quantity of radio frames starting from a frame 0 of the radio frame of the reference cell to a frame 0 of a subsequent closest radio frame of the neighboring cell. A value of K' needs to be consistent with the modulo K used in the reference signal sending method. In this way, the terminal device determines, based on the frame number of the radio frame of the reference cell and the deviation that is between the frame number of the radio frame of the neighboring cell and the frame number of the radio frame of the reference cell and that is sent by the positioning service server, the frame number of the radio frame of a neighboring cell, or the terminal device determines, based on the frame number of the radio frame of the reference cell and the deviation that is between the frame number of the radio frame of the neighboring cell and the frame number of the radio frame of the reference cell and that is notified by the positioning server to the terminal device and the value resulting from performing a modulo operation by using the modulo K', the frame number of the radio frame of the neighboring cell and the value resulting from performing a modulo operation by using the modulo K'. In this way, the terminal device may receive the reference signal of the neighboring cell according to the method in the present invention, to avoid receiving the synchronization signal and the system message of the neighboring cell, thereby reducing power consumption of the terminal device.

For the NB-IoT system, the bandwidth of the NPRS is one RB. In the LTE system, the PRS may support a maximum of 100 RBs. When in-band deployment is performed, the positioning server notifies the NB-IoT terminal device of a resource position of the PRS in the LTE system or configuration information of the PRS in the LTE system, to avoid mutual interference between the PRS in the LTE system and the NPRS in the NB-IoT system. The positioning server may notify the NB-IoT terminal device of the resource position of the PRS in the LTE system in a plurality of manners. In one manner, the positioning server notifies the NB-IoT terminal device in a bitmap manner, and a quantity of bits of the bitmap may be the same as that of subframes that are used for NPRS transmission and that are included in an NPRS occasion. For example, one NPRS occasion has 10 subframes used for NPRS transmission, the bitmap is represented by using 10 bits, and the bitmap is 1001000000. Bits from left to right in sequence correspond to the first subframe, the second subframe, . . . , and the tenth subframe. 1 in the bitmap indicates that the subframe can be used for NPRS transmission, and 0 indicates that the bitmap cannot be used for NPRS transmission. Therefore, the foregoing bitmap indicates that the first subframe, the second subframe, and the fifth subframe can be used for NPRS transmission. The foregoing is merely an example. A meaning of bits in the bitmap and a correspondence between a bit sequence and a subframe in the bitmap are not limited.

The foregoing describes the reference signal transmission method provided in the embodiments of this application with reference to FIG. 3 to FIG. 5. The following describes a communications apparatus and a communications device provided in the embodiments of this application with reference to FIG. 6 to FIG. 7.

Figure 6:
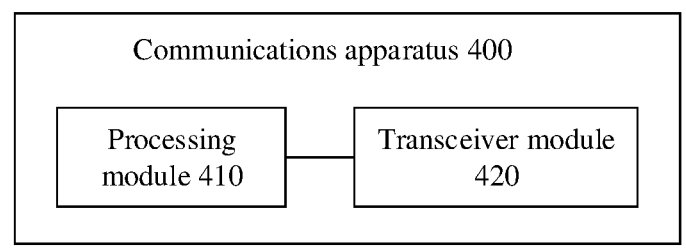
FIG. 6 is a schematic block diagram of a communications apparatus according to an embodiment of this application.

FIG. 6 is a schematic block diagram of a communications apparatus 400 according to an embodiment of this application. The communications apparatus 400 includes a processing module 410 and a transceiver module 420.

In an optional implementation, the communications apparatus 400 is a sending device.

The processing module 410 is configured to generate a reference signal sequence based on a frame number of a radio frame.

The processing module 410 is further configured to map at least a part of reference signals in the reference signal sequence to a resource position that corresponds to the radio frame and that is used to transmit the at least a part of reference signals.

The transceiver module 420 is configured to send the at least a part of reference signals or an orthogonal reference signal at the resource position, where the orthogonal reference signal is obtained by multiplying the at least a part of reference signals by a preset orthogonal code.

Optionally, the processing module 410 is further configured to generate a pseudo-random sequence.

That the processing module 410 is configured to generate a reference signal sequence based on a frame number of the radio frame includes: being configured to generate the reference signal sequence based on at least a part of sequences in the pseudo-random sequence, where an index of the at least a part of sequences corresponds to the frame number of the radio frame.

Optionally, the reference signal sequence $r_{l,n_s}(m)$ meets the following formula:

$$r_{l,n_s}(m) = \frac{1}{\sqrt{2}}(1 - 2 \cdot c(2m + L)) + j\frac{1}{\sqrt{2}}(1 - 2 \cdot c(2m + 1 + L)),$$

$$m = 0, 1, \ldots, N_{RE} \cdot N_{RB} - 1$$

$$L = 2N_{RE} \cdot N_{RB} \cdot n_f,$$

where $n_f$ is the frame number of the radio frame, $N_{RB}$ is a quantity of resource blocks RBs, $N_{RE}$ is a quantity of resource elements REs, $n_s$ is an index of any slot in the radio frame, and l is an index of any symbol in the slot; and $c(2m+L)$ and $c(2m+1+L)$ are the at least a part of sequences in the pseudo-random sequence generated based on an initialization seed, $(2m+L)$ and $(2m+1+L)$ are indexes of the at least a part of sequences, and the initialization seed is determined based on at least one of $n_s$, l, an index of any subframe in the radio frame, a cell identifier, a radio network temporary identifier RNTI, an identifier of a cyclic prefix CP, a reference signal identifier, a channel identifier, a subcarrier identifier, and a carrier identifier.

Optionally, that the processing module 410 is configured to generate a reference signal sequence based on a frame number of the radio frame includes: being configured to perform a modulo operation on the frame number of the radio frame based on a preset value K, where K is a positive integer; and being configured to generate the reference signal sequence based on a value resulting from the frame number of the radio frame mod K.

Optionally, the processing module 410 is further configured to generate a pseudo-random sequence.

That the processing module 410 is configured to generate the reference signal sequence based on a value resulting from the frame number of the radio frame mod K includes: being configured to generate the reference signal sequence based on the at least a part of sequences in the pseudo-random sequence, where an index of the at least a part of sequences corresponds to the value resulting from the frame number of the radio frame mod K.

Optionally, the reference signal sequence $r_{l,n_s}(m)$ meets the following formula:

$$r_{l,n_s}(m) = \frac{1}{\sqrt{2}}(1 - 2 \cdot c(2m + L)) + j\frac{1}{\sqrt{2}}(1 - 2 \cdot c(2m + 1 + L)),$$

$$m = 0, 1, \ldots, N_{RE} \cdot N_{RB} - 1$$

$$L = 2N_{RE} \cdot N_{RB} \cdot (n_f \bmod K),$$

where $n_f$ is the frame number of the radio frame, $N_{RB}$ is a quantity of resource blocks, $N_{RE}$ is a quantity of resource elements REs, $n_s$ is an index of any slot in the radio frame, and l is an index of any symbol in the slot; and $c(2m+L)$ and $c(2m+1+L)$ are the at least a part of sequences in the pseudo-random sequence generated based on an initialization seed, $(2m+L)$ and $(2m+1+L)$ are indexes of the at least a part of sequences, $n_f \bmod K$ is the value resulting from the frame number of the radio frame mod K, and the initialization seed is determined based on at least one of $n_s$, l, an index of any subframe in the radio frame, a cell identifier, a radio network temporary identifier RNTI, an identifier of a cyclic prefix CP, a reference signal identifier, a channel identifier, a subcarrier identifier, and a carrier identifier.

Optionally, that the processing module 410 is configured to generate a reference signal sequence based on a frame number of the radio frame includes: being configured to generate a pseudo-random sequence based on the frame number of the radio frame; and being configured to generate the reference signal sequence based on the pseudo-random sequence.

Optionally, that the processing module 410 is configured to generate a pseudo-random sequence based on the frame number of the radio frame includes: being configured to determine an initialization seed of the pseudo-random sequence based on a first parameter set, where the first parameter set includes the frame number of the radio frame or the value resulting from the frame number of the radio frame mod K, and K is a positive integer; and being configured to generate the pseudo-random sequence based on the initialization seed.

Optionally, the reference signal sequence $r_{l,n_s}(m)$ meets the following formula:

$$r_{l,n_s}(m) = \frac{1}{\sqrt{2}}(1 - 2 \cdot c(2m + L)) + j\frac{1}{\sqrt{2}}(1 - 2 \cdot c(2m + 1 + L)),$$

$$m = 0, 1, \ldots, N_{RE} \cdot N_{RB} - 1$$

$$L = 2N_{RE} \cdot N_{RB} \cdot (N_{symb} \cdot n_s + l),$$

where $N_{RB}$ is a quantity of resource blocks RBs, $N_{RE}$ is a quantity of resource elements REs, $N_{symb}$ is a quantity of symbols in any slot, $n_s$ is an index of any slot in the radio frame, and l is an index of any symbol in the slot; and $c(2m+L)$ and $c(2m+1+L)$ are at least a part of sequences in the pseudo-random sequence generated based on the initialization seed.

Optionally, the first parameter set further includes at least one of an index of any subframe in the radio frame, a cell identifier, a radio network temporary identifier RNTI, an identifier of a cyclic prefix CP, a reference signal identifier, a channel identifier, a subcarrier identifier, and a carrier identifier.

Optionally, the pseudo-random sequence is a Gold sequence.

In another optional implementation, the communications apparatus 400 is a sending device.

The processing module 410 is configured to generate a reference signal sequence.

The processing module 410 is further configured to determine a first index set based on a frame number of a radio frame, where the first index set is used to indicate at least a part of reference signals in the reference signal sequence.

The processing module 410 is further configured to map the at least a part of reference signals to a resource position that corresponds to the radio frame and that is used to transmit the at least a part of reference signals.

The transceiver module 420 is configured to send the at least a part of reference signals or an orthogonal reference signal at the resource position, where the orthogonal reference signal is obtained by multiplying the at least a part of reference signals by a preset orthogonal code.

Optionally, that the processing module 410 determines a first index set based on a frame number of a radio frame includes: being configured to perform a modulo operation on the frame number of the radio frame based on a preset value K; where K is a positive integer; and being configured to determine the first index set based on a value resulting from the frame number of the radio frame mod K.

In an optional implementation, the communications apparatus 400 is a receiving device.

The processing module 410 is configured to generate a reference signal sequence.

The processing module 410 is configured to determine the resource position, and the resource position is a resource position that corresponds to the radio frame and that is used to transmit the at least a part of reference signals.

The transceiver module 420 is configured to receive, at the resource position, the at least a part of reference signals sent by the sending device, or receive the orthogonal reference signal, where the orthogonal reference signal is obtained by multiplying the at least a part of reference signals by the preset orthogonal code.

It should be understood that the processing module 410 in this embodiment of the present invention may be implemented by a processor or a processor-related circuit component, and the transceiver module 420 may be implemented by a transceiver or a transceiver-related circuit component.

Figure 7:
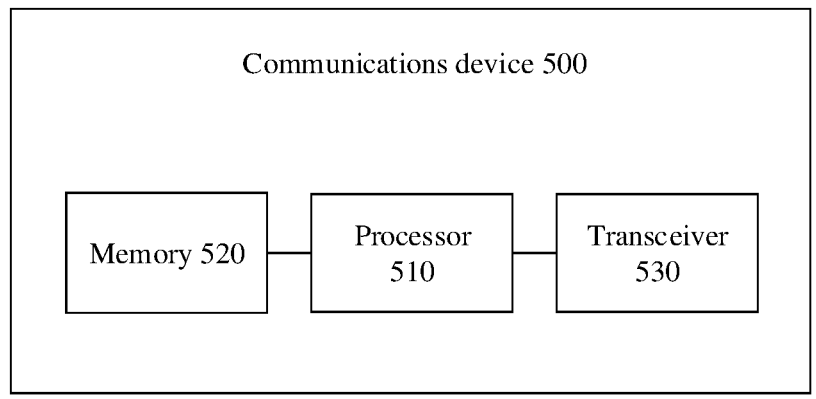
FIG. 7 is another schematic block diagram of a communications device according to an embodiment of this application.

As shown in FIG. 7, an embodiment of the present inventionfurther provides a communications device 500. The communications device 500 includes a processor 510, a memory 520, and a transceiver 530. The memory 520 stores an instruction or a program, and the processor 530 is configured to execute the instruction or the program stored in the memory 520.

In an optional implementation, when the communications device 500 is a sending device, and the instruction or the program stored in the memory 520 is executed, the processor 510 is configured to perform the operation performed by the processing module 410 of the sending device in the foregoing embodiment, and the transceiver 530 is configured to perform the operation performed by the transceiver module 420 of the sending device in the foregoing embodiment.

In another optional implementation, when the communications device 500 is a receiving device, and the instruction or the program stored in the memory 520 is executed, the processor 510 is configured to perform the operation performed by the processing module 410 of the receiving device in the foregoing embodiment, and the transceiver 530 is configured to perform the operation performed by the transceiver module 420 of the receiving device in the foregoing embodiment.

An embodiment of this application provides a computer-readable storage medium. The computer-readable storage medium stores a computer program, and when the program is executed by a processor, the reference signal sequence transmission method in the method 200 or the method 300 is implemented.

An embodiment of this application provides a computer program product. The computer program product includes computer program code. When the computer program code is run by a processing unit or a processor of a communications device, the communications device is enabled to perform the reference signal sequence transmission method in the foregoing method 200 or method 300.

An embodiment of this application provides a chip system. The chip system includes a processor, configured to support a communications device in implementing the reference signal sequence transmission method in the method 200 or the method 300.

It should be understood that, the processor mentioned in the embodiments of the present invention may be a central processing unit (CPU), or may be another general-purpose processor, a digital signal processor (DSP), an application-specific integrated circuit (ASIC), a field programmable gate array (FPGA) or another programmable logical device, a discrete gate or a transistor logical device, a discrete hardware component, or the like. The general-purpose processor may be a microprocessor, or the processor may be any conventional processor or the like.

It may be understood that the memory mentioned in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

It should be noted that when the processor is the general-purpose processor, the DSP, the ASIC, the FPGA, or the another programmable logical device, discrete gate, transistor logical device, or discrete hardware component, the memory (storage module) is integrated into the processor.

It should be noted that the memory described in this specification includes but is not limited to these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units division is merely logical function division and may be other division in actual implementation. For example, a plurality of units or components may be combined or integrated into another system, or some features may be ignored or not performed.

In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
generating, by a second device, a reference signal sequence;
determining, by the second device, a first index set according to a value, wherein the value is a result of a modulo operation on a frame number of a radio frame by a value K, wherein K is a positive integer, wherein the first index set indicates at least one reference signal corresponding to the reference signal sequence, and the first index set comprises at least two indexes;
determining, by the second device according to the first index set, the at least one reference signal corresponding to the reference signal sequence;
mapping, by the second device, the at least one reference signal to a resource position corresponding to the radio frame, wherein the resource position is to be used to transmit the at least one reference signal; and
sending, by the second device, the at least one reference signal at the resource position.

2. The method according to claim 1, wherein each reference signal corresponding to the reference signal sequence is a narrowband positioning reference signal (NPRS).

3. The method according to claim 1, wherein the first index set satisfies a relation as follows:

$m'=(m_0'+2(n_f \bmod 64)) \bmod 220$, wherein m' is the first index set, and $n_f$ is the frame number of the radio frame; and
when the method is used in a narrowband internet of things (NB-IoT) system deployed in a guard band or independently deployed, $m_0'$ satisfies a relation as follows:

$m_{01}=0,1$ $m_0'=m_{01}+N_{RB}^{max,DL}-1$, wherein $N_{RB}^{max,DL}$ indicates the maximum quantity of resource blocks (RBs) supported by the system, and $N_{RB}^{max,DL}=110$.

4. The method according to claim 1, wherein the first index set satisfies a relation as follows:

$m'=(m_0'+2(n_f \bmod 64+1)) \bmod 220$, wherein m' is the first index set, and $n_f$ is the frame number of the radio frame; and
when the method is used in a narrowband internet of things (NB-IoT) system deployed in-band, $m_0'$ satisfies a relation as follows:

$m_{01}=0,1$ $m_0'=m_{01}+2\tilde{n}_{PRB}'+N_{RB}^{max,DL}-\tilde{n}$, wherein $\tilde{n}_{PRB}$ is used to determine an index of an RB occupied by the at least one reference signal, and $\tilde{n}$ is used to indicate that a quantity of RBs corresponding to a long term evolution (LTE) system bandwidth is an odd number or an even number; when $\tilde{n}=1$, it represents that the quantity of RBs corresponding to the LTE system bandwidth is an odd number, or when $\tilde{n}=0$, it represents that the quantity of RBs corresponding to the LTE system bandwidth is an even number; and $N_{RB}^{max,DL}$ represents the maximum quantity of RBs supported by the system, and $N_{RB}^{max,DL}=100$.

5. A second device, comprising:
a processor; and
a non-transitory computer-readable storage medium storing a program to be executed by the processor, the program including instructions for:
generating a reference signal sequence; and
determining a first index set according to a value, wherein the value is a result of a modulo operation on a frame number of a radio frame by a value K, wherein K is a positive integer, wherein the first index set indicates at least one reference signal corresponding to the reference signal sequence, and the first index set comprises at least two indexes; and
mapping the at least one reference signal to a resource position corresponding to the radio frame, wherein the resource position is to be used to transmit the at least one reference signal; and
a transceiver, configured to send the at least one reference signal at the resource position.

6. The device according to claim 5, wherein each reference signal corresponding to the reference signal sequence is a narrowband positioning reference signal (NPRS).

7. The device according to claim 5, wherein the first index set satisfies a relation as follows:

$m'=(m_0'+2(n_f \bmod 64)) \bmod 220$, wherein m' is the first index set, and $n_f$ is the frame number of radio frame; and when the device is used in a narrowband internet of things (NB-IoT) system deployed in a guard band or independently deployed, $m_0'$ satisfies a relation as follows:

$$m_{01}=0,1$$

$$m_0'=m_{01}+N_{RB}^{max,DL}-1, \text{ wherein}$$

$N_{RB}^{max,DL}$ indicates the maximum quantity of (RBs) supported by the system, and $N_{RB}^{max,DL}=110$.

8. The device according to claim 5, wherein the first index set satisfies a relation as follows:

$$m'=(m_0'+2(n_f \bmod 64))\bmod 220, \text{ wherein}$$

m' is the first index set, and $n_f$ is the frame number of the radio frame; and when the device is used in a narrowband internet of things (NB-IoT) system deployed in-band, $m_0'$ satisfies a relation as follows:

$$m_{01}=0,1$$

$$m_0'=m_{01}+2\dot{n}_{PRB}'+N_{RB}^{max,DL}-\tilde{n}l, \text{ wherein}$$

$\dot{n}_{PRB}$ is used to determine an index of an RB occupied by the at least one reference signal, and $\tilde{n}$ is used to indicate that a quantity of RBs corresponding to a long term evolution (LTE) system bandwidth is an odd number or an even number; when $\tilde{n}=1$, it represents that the quantity of RBs corresponding to the LTE system bandwidth is an odd number, or when $\tilde{n}=0$, it represents that the quantity of RBs corresponding to the LTE system bandwidth is an even number; and $N_{RB}^{max,DL}$ represents the maximum quantity of RBs supported by the system, and $N_{RB}^{max,DL}=100$.

9. A method, comprising:
generating, by a first device, a reference signal sequence;
determining, by the first device, a resource position to use to receive at least one first reference signal;
receiving, by the first device, the at least one first reference signal from a second device at the resource position;
determining, by the first device, a first index set according to a value, wherein the value is a result of a modulo operation on a frame number of a radio frame by a value K, wherein K is a positive integer, the radio frame corresponds to the resource position, and wherein the first index set indicates a reference signal index of at least one second reference signal corresponding to the reference signal sequence, and the first index set comprises at least two indexes; and
determining, by the first device, the at least one second reference signal from the generated reference signal sequence based on the first index set, wherein the reference signal index of the at least one second reference signal is the same as a reference signal index of the at least one first reference signal.

10. The method according to claim 9, further comprising: processing the at least one first reference signal and the at least one second reference signal.

11. The method according to claim 9, wherein the at least one first reference signal is at least one of reference signals indicated by the first index set corresponding to the reference signal sequence generated by the second device.

12. The method according to claim 9, wherein each reference signal corresponding to the reference signal sequence is a narrowband positioning reference signal (NPRS), and the first index set satisfies a relation as follows:

$$m'=(m_0'+2(n_f \bmod 64))\bmod 220, \text{ wherein}$$

m' is the first index set, and $n_f$ is the frame number of the radio frame; and when the method is used in a narrowband internet of things (NB-IoT) system deployed in a guard band or independently deployed, $m_0'$ meets a relation as follows:

$$m_{01}=0,1$$

$$m_0'=m_{01}+N_{RB}^{max,DL}-1, \text{ wherein}$$

$N_{RB}^{max,DL}$ indicates the maximum quantity of (RBs) supported by the system, and $N_{RB}^{max,DL}=110$.

13. The method according to claim 9, wherein each reference signal corresponding to the reference signal sequence is a narrowband positioning reference signal.

14. The method according to claim 9, wherein each reference signal corresponding to the reference signal sequence is a narrowband positioning reference signal (NPRS), and the first index set satisfies a relation as follows:

$$m'=(m_0'+2(n_f \bmod 64))\bmod 220, \text{ wherein}$$

m' is the first index set, and $n_f$ is the frame number of the radio frame; and when the method is used in a narrowband internet of things (NB-IoT) system deployed in-band, $m_0'$ satisfies a relation as follows:

$$m_{01}=0,1$$

$$m_0'=m_{01}+2\dot{n}_{PRB}'+N_{RB}^{max,DL}-\tilde{n}, \text{ wherein}$$

$\dot{n}_{PRB}$ is used to determine an index of an RB occupied by the at least one reference signal, and $\tilde{n}$ is used to indicate that a quantity of RBs corresponding to a long term evolution (LTE) system bandwidth is an odd number or an even number; when $\tilde{n}=1$, it represents that the quantity of RBs corresponding to the LTE system bandwidth is an odd number, or when $\tilde{n}=0$, it represents that the quantity of RBs corresponding to the LTE system bandwidth is an even number; and $N_{RB}^{max,DL}$ represents the maximum quantity of RBs supported by the system, and $N_{RB}^{max,DL}=100$.

15. A first device, comprising:
a transceiver;
a processor; and
a non-transitory computer-readable storage medium storing a program to be executed by the processor, the program including instructions for:
generating a reference signal sequence;
determining a resource position to use to receive at least one first reference signal; and
controlling the transceiver to receive the at least one first reference signal from a second device at the resource position;
determining a first index set according to a value, wherein the value is a result of a modulo operation on a frame number of a radio frame by a value K, wherein K is a positive integer, and the radio frame corresponds to the resource position, and wherein the first index set indicates a reference signal index of at least one second reference signal corresponding to the reference signal sequence, and the first index set comprises at least two indexes; and
determining the at least one second reference signal from the generated reference signal sequence based on the first index set, wherein the reference signal index of the at least one second reference signal is the same as a reference signal index of the at least one first reference signal.

16. The device according to claim 15, wherein the program further includes instructions for:
processing the at least one first reference signal and the at least one second reference signal.

17. The device according to claim 15, wherein the at least one first reference signal is indicated by the first index set corresponding to the reference signal sequence generated by the second device.

18. The device according to claim 15, wherein each reference signal corresponding to the reference signal sequence is a narrowband positioning reference signal (NPRS), and the first index set satisfies a relation as follows:

$$m'=(m_0'+2(n_f \bmod 64))\bmod 220, \text{ wherein}$$

m' is the first index set, and $n_f$ is the frame number of the radio frame; and when the device is used in a narrowband internet of things (NB-IoT) system deployed in a guard band or independently deployed, $m_0'$ satisfies a relation as follows:

$$m_{01}=0,1$$

$$m_0'=m_{01}+N_{RB}^{max,DL}-1, \text{ wherein}$$

$N_{RB}^{max,DL}$ indicates the maximum quantity of (RBs) supported by the system, and for the NPRS, $N_{RB}^{max,DL}=110$.

19. The device according to claim 15, wherein each reference signal corresponding to the reference signal sequence is a narrowband positioning reference signal.

20. The device according to claim 15, wherein each reference signal corresponding to the reference signal sequence is a narrowband positioning reference signal (NPRS), and the first index set satisfies a relation as follows:

$$m'=(m_0'+2(n_f \bmod 64))\bmod 220, \text{ wherein}$$

m' is the first index set, and $n_f$ is the frame number of the radio frame; and when the method is used in a narrowband internet of things (NB-IoT) system deployed in-band, $m_0'$ satisfies a relation as follows:

$$m_{01}=0,1$$

$$m_0'=m_{01}+2\dot{n}_{PRB}'+N_{RB}^{max,DL}-\tilde{n}, \text{ wherein}$$

$\dot{n}_{PRB}$ is used to determine an index of an RB occupied by the at least one reference signal, and $\tilde{n}$ is used to indicate that a quantity of RBs corresponding to a long term evolution (LTE) system bandwidth is an odd number or an even number; when $\tilde{n}=1$, it represents that the quantity of RBs corresponding to the LTE system bandwidth is an odd number, or when $\tilde{n}=0$, it represents that the quantity of RBs corresponding to the LTE system bandwidth is an even number; and $N_{RB}^{max,DL}$ represents the maximum quantity of RBs supported by the system, and $N_{RB}^{max,DL}=100$.

* * * * *

UNITED STATES PATENT AND TRADEMARK OFFICE
CERTIFICATE OF CORRECTION

PATENT NO. : 11,539,485 B2  
APPLICATION NO. : 16/992864  
DATED : December 27, 2022  
INVENTOR(S) : Luo Page 1 of 2

It is certified that error appears in the above-identified patent and that said Letters Patent is hereby corrected as shown below:

In the Claims

Claim 4, Column 46, Line 19; delete "+1".

Claim 4, Column 46, Lines 28-29; delete "$m_0'=m_{01}+2\dot{n}_{PRB}'+N_{RB}^{max,DL}-\tilde{n}$, wherein $\dot{n}_{PRB}$" and insert
$$m_{01} = 0,1$$
$$\text{-- } m_0' = m_{01} + 2n_{PRB}' + N_{RB}^{max,DL} - \tilde{n} \text{, wherein}$$
$$n_{PRB}' \text{ --.}$$

Claim 4, Column 46, Line 39; delete "100" and insert --110--.

Claim 7, Column 46, Line 66; insert --the-- between "of" and "radio".

Claim 7, Column 47, Line 1; delete "a narroband" and insert --an narrowband--.

Claim 8, Column 47, Lines 21-22; delete "$m_0'=m_{01}+2\dot{n}_{PRB}'+N_{RB}^{max,DL}-\tilde{n}l$, wherein $\dot{n}_{PRB}$" and insert
$$m_{01} = 0,1$$
$$\text{-- } m_0' = m_{01} + 2n_{PRB}' + N_{RB}^{max,DL} - \tilde{n} \text{, wherein}$$
$$n_{PRB}' \text{ --.}$$

Claim 8, Column 47, Line 32; delete "100" and insert --110--.

Claim 12, Column 48, Line 10; delete "the maximum quantity of (RBs)" and insert --a maximum quantity of resource blocks (RBs).--.

Claim 14, Column 48, Line 24; delete "satisfies" and insert --meets--.

Signed and Sealed this  
Seventh Day of February, 2023

Katherine Kelly Vidal  
*Director of the United States Patent and Trademark Office*

Claim 14, Column 48, Lines 27-30; delete "$m_0' = m_{01} + 2\dot{n}_{PRB}' + N_{RB}^{max,DL} - \tilde{n}$, wherein $\dot{n}_{PRB}$" and insert --$m_0' = m_{01} + 2\,n_{PRB}' + N_{RB}^{max,DL} - \tilde{n}$, wherein $n_{PRB}'$ $m_{01} = 0, 1$
--.

Claim 14, Column 48, Line 40; delete "100" and insert --110--.

Claim 18, Column 49, Line 19; delete "satisfies" and insert --meets--.

Claim 18, Column 49, Line 23; delete "the maximum quantity of (RBs)" and insert --the maximum quantity of resource blocks (RBs)--.

Claim 20, Column 50, Line 9; delete "method" and insert --device--.

Claim 20, Column 50, Lines 12-15; delete "$m_0' = m_{01} + 2\dot{n}_{PRB}' + N_{RB}^{max,DL} - \tilde{n}$, wherein $\dot{n}_{PRB}$" and insert --$m_0' = m_{01} + 2\,n_{PRB}' + N_{RB}^{max,DL} - \tilde{n}$, wherein $n_{PRB}'$ $m_{01} = 0, 1$
--.

Claim 20, Column 50, Line 26; delete "100" and insert --10--.